United States Patent
Bittner et al.

(10) Patent No.: US 12,036,944 B2
(45) Date of Patent: Jul. 16, 2024

(54) RESTRAINT SYSTEM FOR A VEHICLE SEAT OPERATIVELY MOUNTED IN A MOTOR VEHICLE

(71) Applicant: Indiana Mills & Manufacturing, Inc., Westfield, IN (US)

(72) Inventors: Douglas W. Bittner, Indianapolis, IN (US); Jeffrey A. King, Markleville, IN (US); Chris P. Jessup, Sheridan, IN (US); Steven Gale, Colfax, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 18/297,919

(22) Filed: Apr. 10, 2023

(65) Prior Publication Data

US 2023/0242066 A1 Aug. 3, 2023

Related U.S. Application Data

(63) Continuation of application No. 17/422,256, filed as application No. PCT/US2020/014217 on Jan. 17, 2020, now Pat. No. 11,713,020.

(60) Provisional application No. 62/855,048, filed on May 31, 2019, provisional application No. 62/793,879, filed on Jan. 17, 2019.

(51) Int. Cl.
| | |
|---|---|
| *B60R 22/26* | (2006.01) |
| *B60N 2/10* | (2006.01) |
| *B60R 22/24* | (2006.01) |
| *B60N 2/12* | (2006.01) |
| *B60R 22/02* | (2006.01) |
| *B60R 22/18* | (2006.01) |

(52) U.S. Cl.
CPC ............... *B60R 22/26* (2013.01); *B60N 2/10* (2013.01); *B60R 22/24* (2013.01); *B60N 2/12* (2013.01); *B60R 2022/027* (2013.01); *B60R 2022/1818* (2013.01)

(58) Field of Classification Search
CPC ... B60R 22/24; B60R 22/26; B60R 2022/027; B60R 2022/1818; B60N 2/10; B60N 2/12
USPC ........................................................ 297/470
See application file for complete search history.

(56) References Cited

U.S. PATENT DOCUMENTS

| | | |
|---|---|---|
| 4,720,143 A | 1/1988 | Schwartz et al. |
| 5,178,439 A | 1/1993 | McCracken |
| (Continued) | | |

FOREIGN PATENT DOCUMENTS

| | | |
|---|---|---|
| WO | 2013188614 A1 | 12/2013 |
| WO | 2018093852 A2 | 5/2018 |

OTHER PUBLICATIONS

Extended European Search Report Issued Aug. 29, 2022 in application EP 20741620.7.
(Continued)

*Primary Examiner* — Mark R Wendell
(74) *Attorney, Agent, or Firm* — Barnes & Thornburg LLP

(57) ABSTRACT

A restraint system for a vehicle seat operatively mounted in a motor vehicle may include a restraint web operatively coupled to at least one of the vehicle seat and the motor vehicle, an elongated sleeve received on and at least partially about the restraint web, and a sleeve position adjuster coupled to the sleeve and including an actuator normally engaging a portion of the restraint web to fix a position of the sleeve relative to the restraint web and responsive to actua-
(Continued)

tion thereof to disengage from the restraint web to allow the sleeve to be moved along the restraint web.

20 Claims, 22 Drawing Sheets

(56) References Cited

U.S. PATENT DOCUMENTS

| | | |
|---|---|---|
| 5,224,750 A | 7/1993 | Clark et al. |
| 6,322,149 B1 | 11/2001 | Conforti et al. |
| 8,002,348 B2 | 8/2011 | Jessup et al. |
| 8,783,782 B2 | 7/2014 | Park |
| 9,015,949 B2 | 4/2015 | Bernardo |
| 9,669,798 B1 | 6/2017 | Maitland |
| 9,744,933 B1 | 8/2017 | Rao et al. |
| 9,884,609 B2 | 2/2018 | Bittner et al. |
| 2004/0026981 A1 | 2/2004 | Maloney et al. |
| 2006/0125227 A1 | 6/2006 | Beczkowski et al. |
| 2007/0290535 A1 | 12/2007 | Meredith et al. |
| 2012/0019042 A1 | 1/2012 | Park |
| 2012/0205960 A1 | 8/2012 | Finch |
| 2014/0138942 A1 | 5/2014 | Rouhana |
| 2019/0381913 A1 | 12/2019 | Banales Cano et al. |

OTHER PUBLICATIONS

PCT International Search Report and Written Opinion completed by the ISA/US on Mar. 5, 2020 and issued in connection with PCT/US2020/014217.

International Preliminary Report on Patentability completed by the IPEA/US on Jan. 26, 2021 and issued in connection with PCT/US2020/014217.

International Search Report and Written Opinion for PCT/US21/18138 completed Apr. 6, 2021.

International Preliminary Report on Patentability for PCT/US2021/018138 issued Apr. 23, 2022.

RESTRAINT SYSTEM FOR A VEHICLE SEAT OPERATIVELY MOUNTED IN A MOTOR VEHICLE

CROSS-REFERENCE TO RELATED APPLICATIONS

This application is a continuation of U.S. patent application Ser. No. 17/422,256, filed Jul. 12, 2021, which is a U.S. national stage entry of PCT Application No. PCT/US2020/014217, filed Jan. 17, 2020, which claims the benefit of and priority to U.S. Provisional Patent Application No. 62/793,879, filed Jan. 17, 2019, and to U.S. Provisional Patent Application No. 62/855,048, filed May 31, 2019, the disclosures of which are expressly incorporated herein by reference in their entireties.

FIELD OF THE DISCLOSURE

This disclosure relates generally to restraint systems, and more specifically to such restraint systems for vehicle seats operatively mounted in motor vehicles.

BACKGROUND

Conventional motor vehicles may be equipped with one or more restraint devices for restraining occupants in vehicle seats mounted therein. Such restraint devices may include two or more points of connection to the motor vehicle seat and/or to the motor vehicle.

SUMMARY

The present disclosure may comprise one or more of the features recited in the attached claims, and/or one or more of the following features and combinations thereof. In one aspect, a restraint system for a vehicle seat operatively mounted in a motor vehicle may comprise a restraint web operatively coupled to the vehicle seat, an elongated sleeve received on the restraint web such that the restraint web passes through the elongated sleeve, and a clamp coupled to the sleeve and including an actuator responsive to actuation thereof to selectively engage the restraint web to fix the sleeve thereto and to selectively disengage from the restraint web to allow the sleeve to be moved along the restraint web.

In another aspect, a restraint system for a vehicle seat operatively mounted in a motor vehicle may comprise a restraint web operatively coupled to the vehicle seat, a spool guide operatively mounted to the vehicle seat, a spool mounted to and movable relative to the spool guide, the restraint web extending at least partially over and riding on the spool, and a biasing member coupled to and between the spool and the spool guide, the biasing member biasing the spool in a first direction relative to the spool guide, the spool movable against the bias of the biasing member in a second direction opposite the first direction to dampen restraint web forces acting on the spool.

In yet another aspect, a restraint system for a vehicle seat operatively mounted in a motor vehicle and configured to pivot forwardly and rearwardly relative to the motor vehicle may comprise a bracket having one end configured to pivotally mount to a frame or support structure of the motor vehicle behind the vehicle seat, a coupling pin mounted to an opposite end of the bracket and configured to engage a rear portion of a seat back of the vehicle seat, and a biasing member configured to bias the bracket pivot away from the frame or support structure, wherein, upon pivoting the vehicle seat forwardly relative to the motor vehicle, the bracket is responsive to bias of the biasing member to pivot toward the vehicle seat to guide the coupling pin out of engagement with the rear portion of the seat back.

In yet a further aspect, a restraint system for a vehicle seat operatively mounted in a motor vehicle and configured to be adjustably positionable fore and aft relative to the motor vehicle may comprise a bracket having one end configured to pivotally mount to a frame or support structure of the motor vehicle behind the vehicle seat, a coupling pin mounted to an opposite end of the bracket and configured to engage a rear portion of a seat back of the vehicle seat, and a biasing member configured to bias the bracket pivot away from the frame or support structure, wherein, upon forward movement of vehicle seat relative to the motor vehicle, the bracket is responsive to bias of the biasing member to pivot toward the vehicle seat to maintain engagement between the coupling pin and the rear portion of the forwardly moving seat back.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWINGS

Figure 1A:
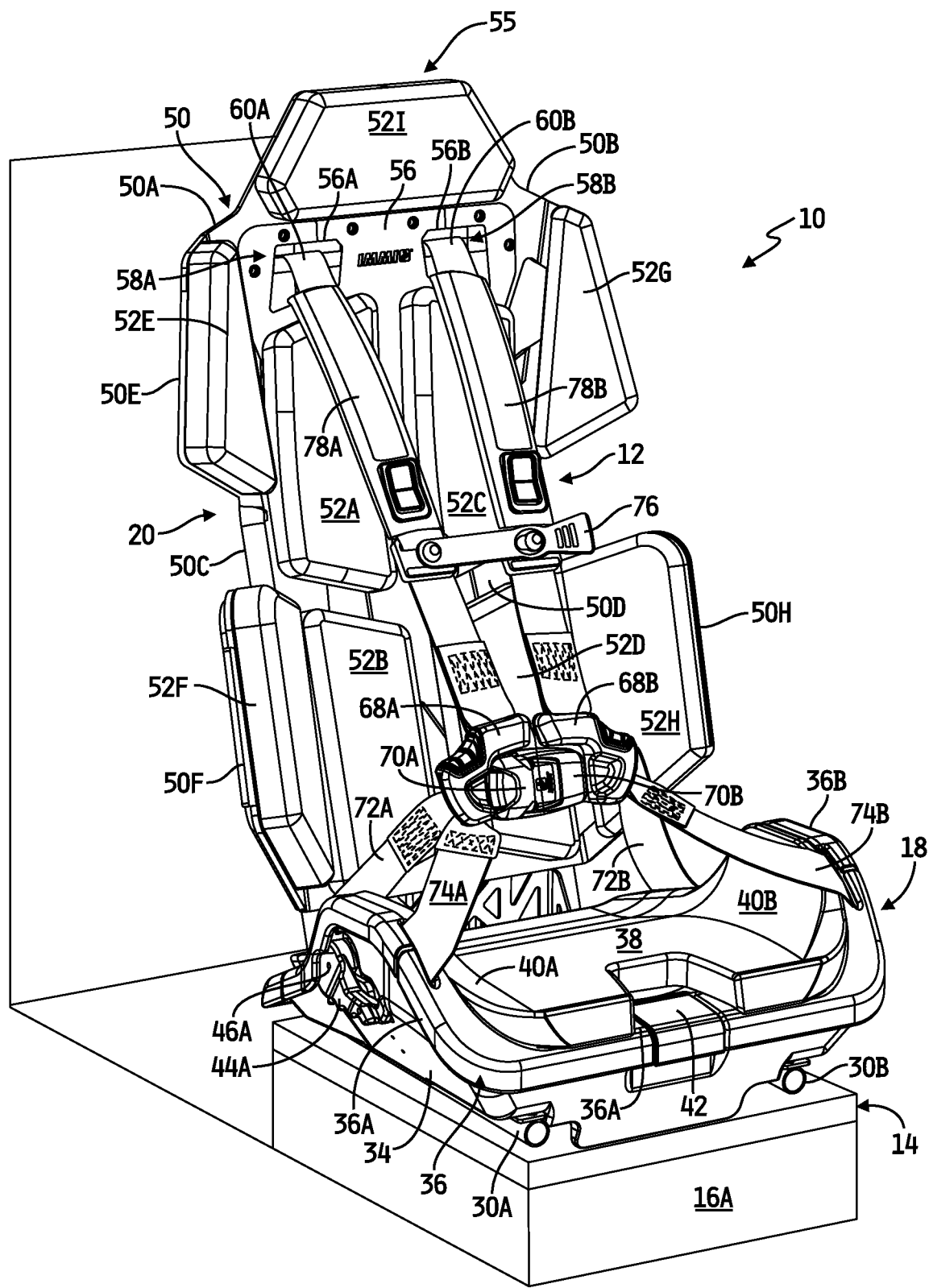
FIG. 1A is a front perspective view of an embodiment of a vehicle seat operatively mountable in a motor vehicle and an embodiment of a seat occupant restraint system therefor.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to a restraint system for a vehicle seat operatively mounted in a motor vehicle. The subject restraint system illustratively includes a number of different restraint structures and components, some non-limiting examples of which will be described in detail below. In the attached figures, the motor vehicle in which the vehicle seat and one or more of the restraint system components are to be mounted is represented in the form of example motor vehicle frame components or structures to which one or more structures of the vehicle seat and/or restraint system(s) are to be mounted. In some embodiments, the motor vehicle in which the vehicle seat and associated restraint system components are to be mounted is illustratively, but not exclusively, an off-road motor vehicle such as an all-terrain vehicle (ATV) or the like. It will be understood that the vehicle seat and/or one or more restraint components may alternatively be mounted within other motor vehicles without limitation. It will be further understood that whereas the vehicle seat and associated restraint system is illustrated in the attached drawings and described below as including multiple different occupant and vehicle seat restraint components, the illustrated seat or other motor vehicle seat may alternatively be outfitted with only a single one or any combination of any of the multiple different occupant and/or vehicle seat restraint components described herein by example.

Figure 1B:
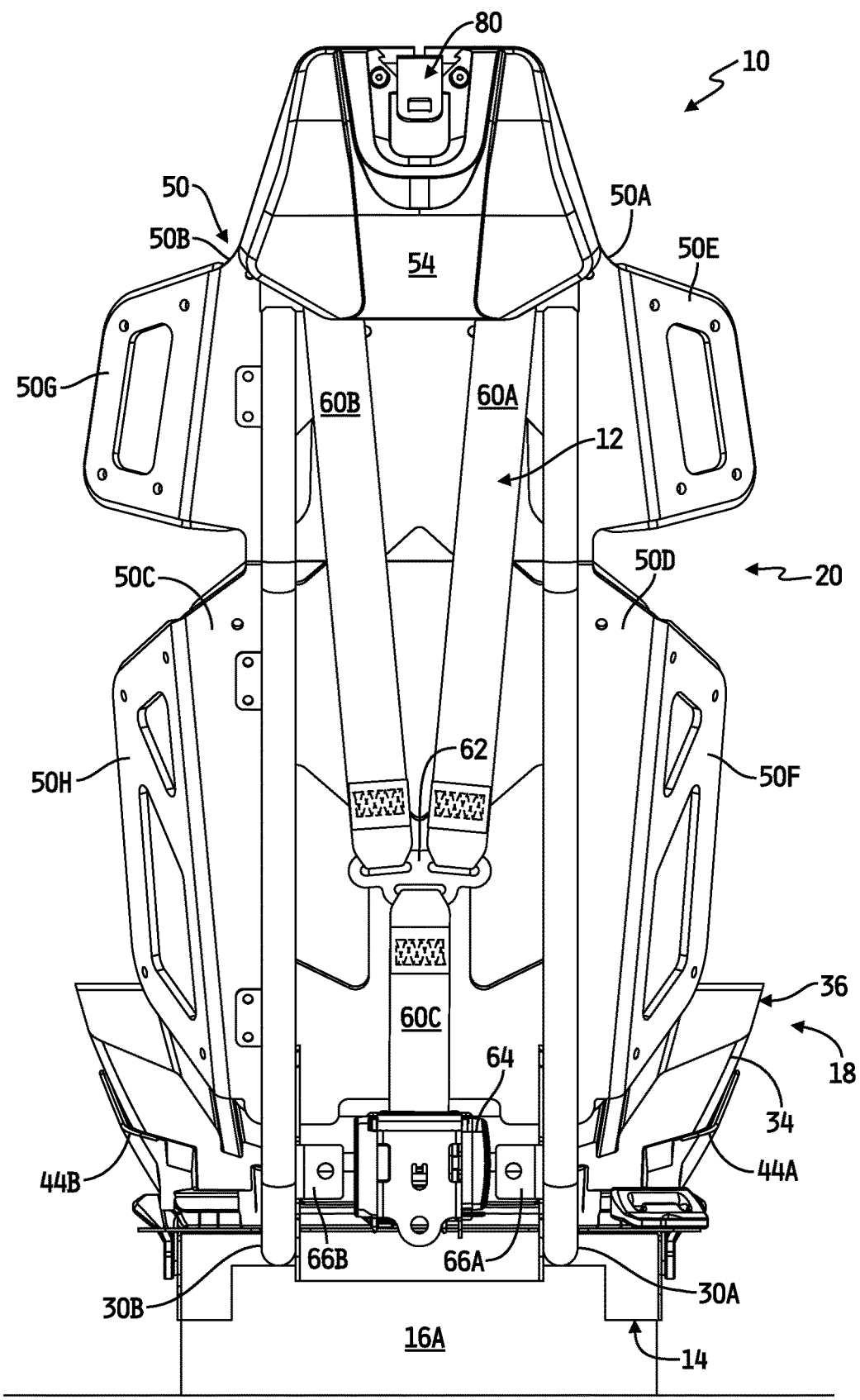
FIG. 1B is a rear elevational view of the vehicle seat and occupant restraint system of FIG. 1.
Figure 2:
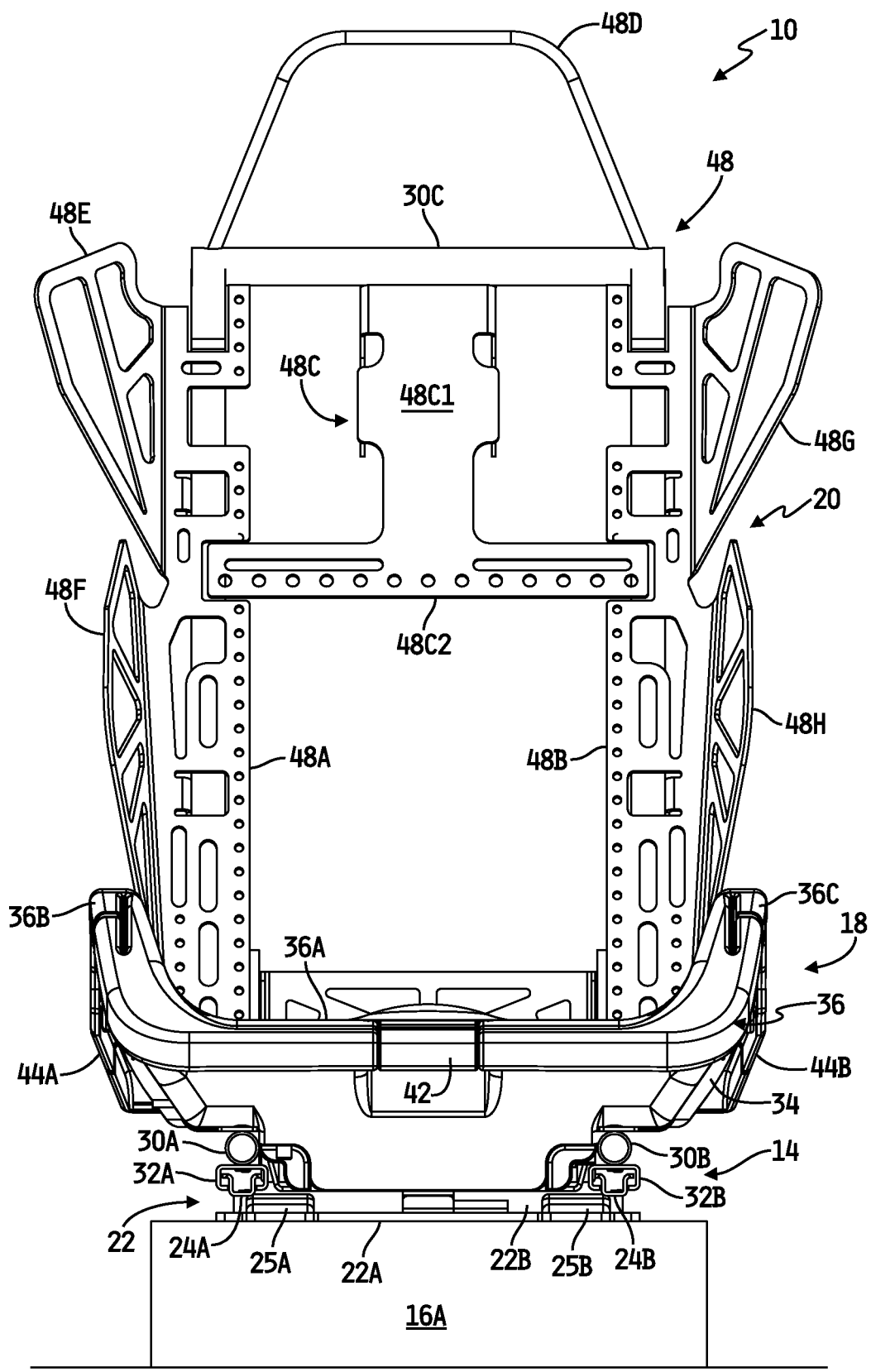
FIG. 2 is a front elevational view of the vehicle seat of FIGS. 1 and 2 with the occupant restraint system removed and with the various panels and cushion pads removed from the seat back to illustrate an embodiment of frame components making up a support frame of the seat back.
Figure 3:
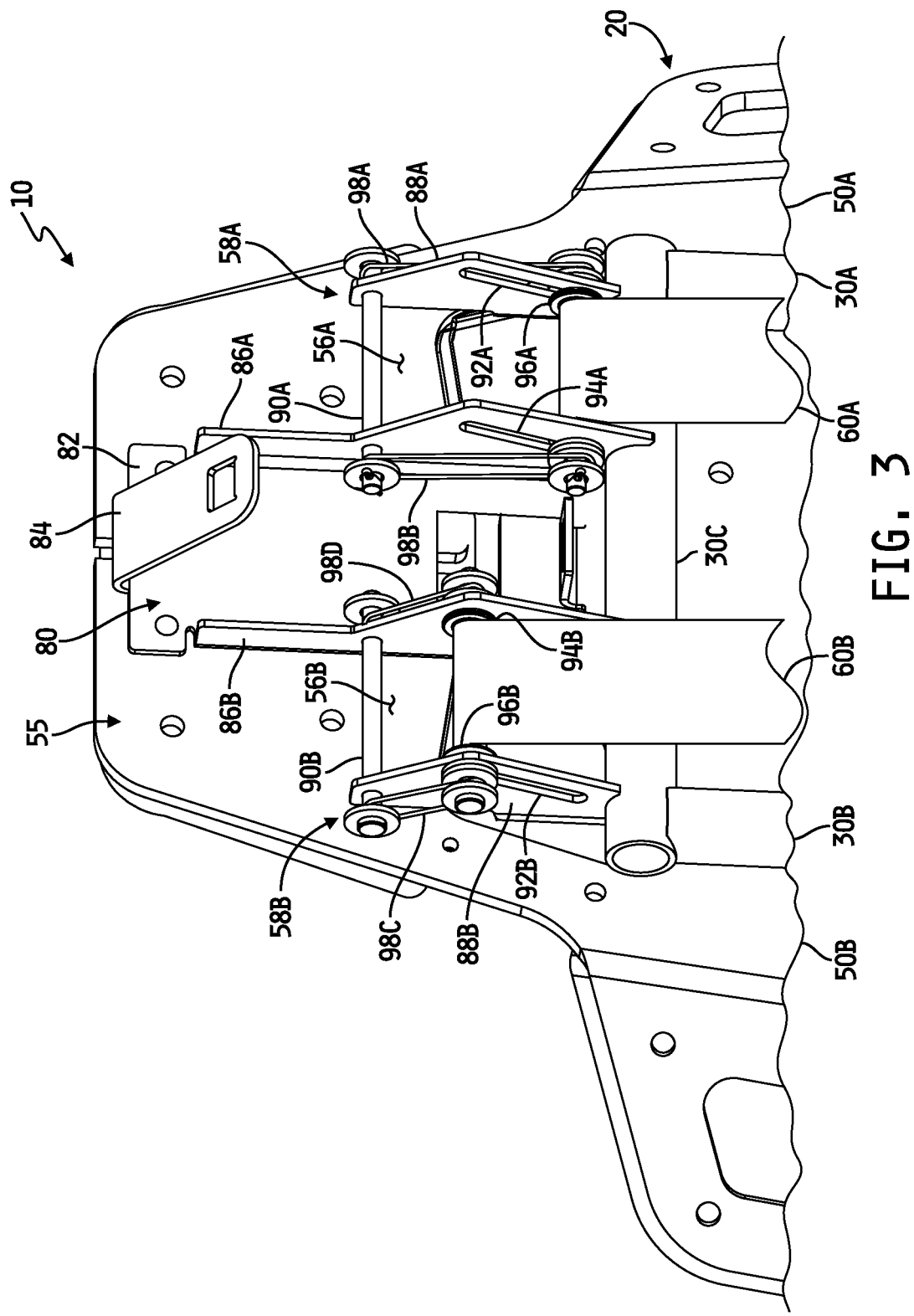
FIG. 3 is a magnified and rear perspective view of an upper portion of the seat back of the vehicle seat of FIGS. 1A-2 with various panels removed from the seat back to illustrate an embodiment of, and operation of, shoulder web attenuators mounted to the seat back and to illustrate an embodiment of an engagement assembly mounted to the seat back and configured to engage an embodiment of a seat restraint system.

Referring now to FIGS. 1-3, an embodiment of a vehicle seat 10 operatively mountable in a motor vehicle and an occupant restraint system 12 therefor is shown. In the illustrated embodiment, the vehicle seat 10 includes a seat base 14 mountable to a floor or floor frame of a motor vehicle. In the illustrated embodiment, the floor or floor frame of the motor vehicle is represented by a floor or floor frame component 16A, and a rear structure or frame of the motor vehicle rearwardly of the floor frame component 16A is represented be a rear frame component 16B. In any case, the seat base 14 is illustratively movably coupled to a seat bottom module 18 which is coupled to a seat back module 20 extending upwardly and away from the seat bottom module 18.

The seat base 14 is may be conventional and may include conventional structure(s) for pivoting, i.e., folding, the seat 10 forwardly, e.g., so as to allow for ingress to and exit from a portion of the motor vehicle rearwardly of the seat 10, and/or for sliding the vehicle seat 10 fore and/or aft to selectively position the vehicle seat 10 relative to the motor vehicle. In this regard, a non-limiting embodiment of a seat base 14 is illustrated by example in FIG. 2. Referring to FIG. 2, the example seat base 14 illustratively includes a pivoting mounting plate assembly 22 having face-to-face lower and upper plates 22A, 22B, wherein the lower plate 22A is affixed to the floor or floor frame component 16A, e.g., by conventional fixation elements. The upper plate 22B is illustratively affixed to elongated seat adjustment tracks 24A, 24B respectively disposed along opposite sides of the vehicle seat 10 and both extending at least partially between the front and rear of the vehicle seat 10. Complementary elongated seat adjustment tracks 32A, 22B are affixed to respective frame components 30A, 30B of the vehicle seat 10. The tracks 24A, 24B and the tracks 32A, 32B are configured to slidingly engage one another such that the track 32A is movable along the track 24A and the track 32B is movable along the track 24B. The tracks 24A, 24B and 32A, 32B illustratively include a conventional locking mechanism which is operatively coupled to a lever (not shown) for slidably positioning the tracks 24A, 24B, and thus selectively positioning the seat 10, fore and aft relative to the tracks 32A, 32B to any of a range of positions between a maximum forward position and a maximum rearward position.

The lower plate 22A and the upper plate 22B are hingedly and pivotably coupled to one another via a pair of hinges 25A, 25B positioned along the front of the seat bottom module 14. The lower plate 22A of the mounting plate assembly 22 is thus hingedly coupled to the upper plate 22B along the front of the seat bottom module 18. As illustrated by example in FIGS. 11B, 15A and 15B, the vehicle seat 10 is illustratively pivotable about the hinges 25A, 25B such that the vehicle seat 10 is pivotable forwardly from an occupant support position in which the plates 22A, 22B are face-to-face and, in some embodiments, in contact with one another along their opposing faces, to any of a range of forwardly tilted positions in which the opposed faces of the plates 22A, 22B are separated from one another and form an angle therebetween relative to the hinges 25A, 25B. In the forward tilted position of the vehicle seat 10, access may be had, for example, to a rear seat or rear compartment of the motor vehicle. The vehicle seat 10 is pivotable about the hinges 25A, 25B from any such position back to the occupant support position illustrated in FIGS. 1A-2, wherein the plate 22A remains affixed to the floor frame component 16A and the plate 22B travels with the seat 10.

It bears pointing out that the embodiment of the seat base 14 illustrated in FIG. 2 and described above is provided only by way of example, and is not intended to be limiting in any way. Those skilled in the art will recognize other configurations of the seat base 14 that may be used to mount the vehicle seat 10 to a motor vehicle, and it will be understood that any such other seat base configurations are intended to fall within the scope of this disclosure. Some such alternate embodiments may be configured to be slidably positionable fore and/or aft only (i.e., not pivotable), some may be configured to be pivotable only (i.e., not slidably positionable) and some may be configured to be both slidably positionable and pivotable as just described.

The seat bottom module 18 illustratively includes a seat module base 34 secured to the frame components 30A, 30B of the vehicle seat 10. An occupant support panel 36 is secured to the seat base 34 and illustratively defines a recessed center portion 36A flanked by upwardly extending side walls 36B, 36C at respective opposite sides of the vehicle seat 10. A seat cushion 38 is mounted or otherwise disposed in the center portion 36A, and side cushions 40A, 40B are illustratively disposed on either side of the seat cushion 36A. In some embodiments, the side cushions 40A, 40B are integral with the seat cushion 36A, i.e., such that the cushions 36A, 40A, 40B are together of unitary constructions, although in other embodiments one or both of the side cushions 40A, 40B is/are structurally separate from the seat cushion 36A.

Figure 7:
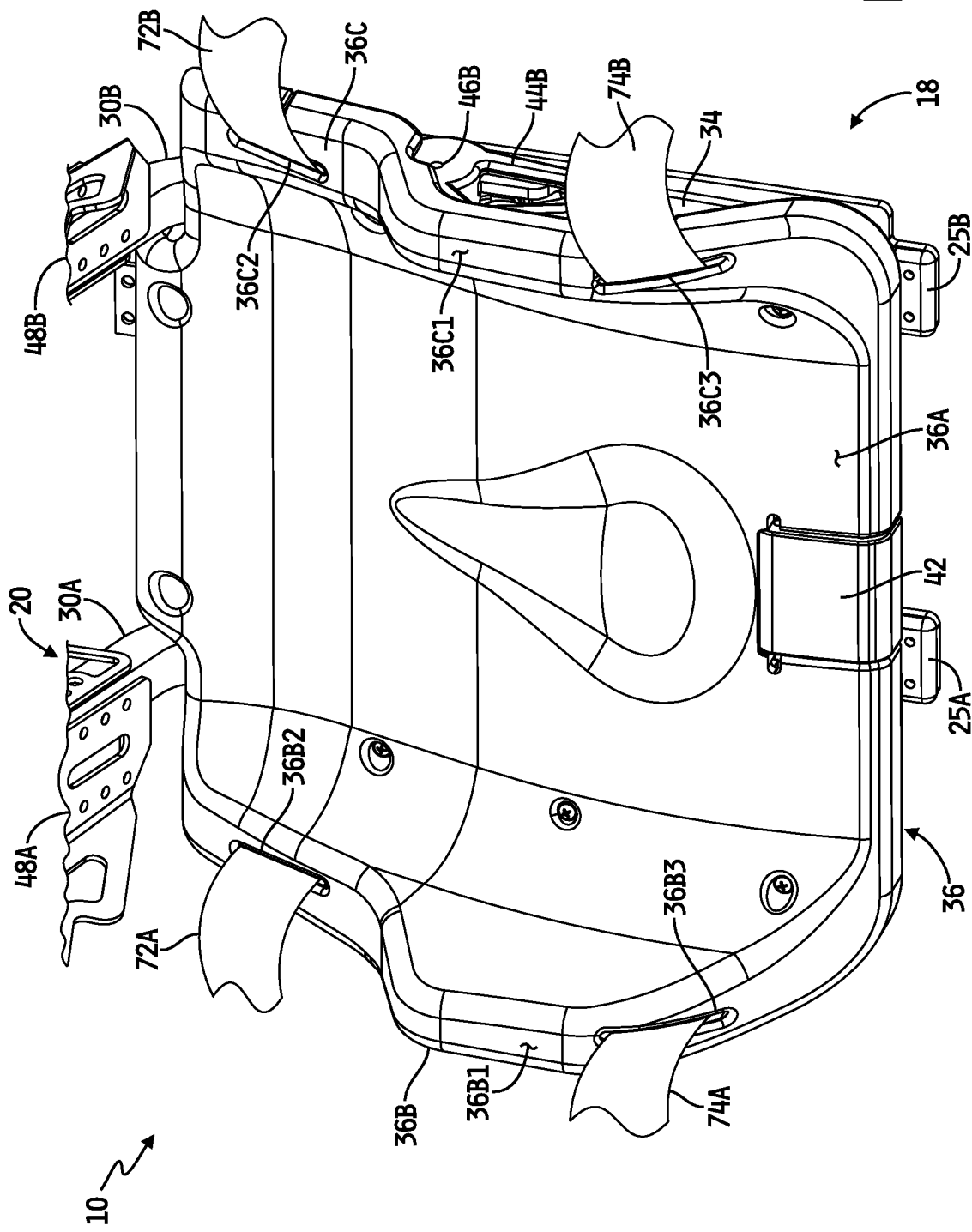
FIG. 7 is a magnified and front perspective view of the occupant support surface of the occupant support panel of the seat module illustrating example routing of the lap and thigh webs of the occupant restraint harness therethrough.
Figure 8:
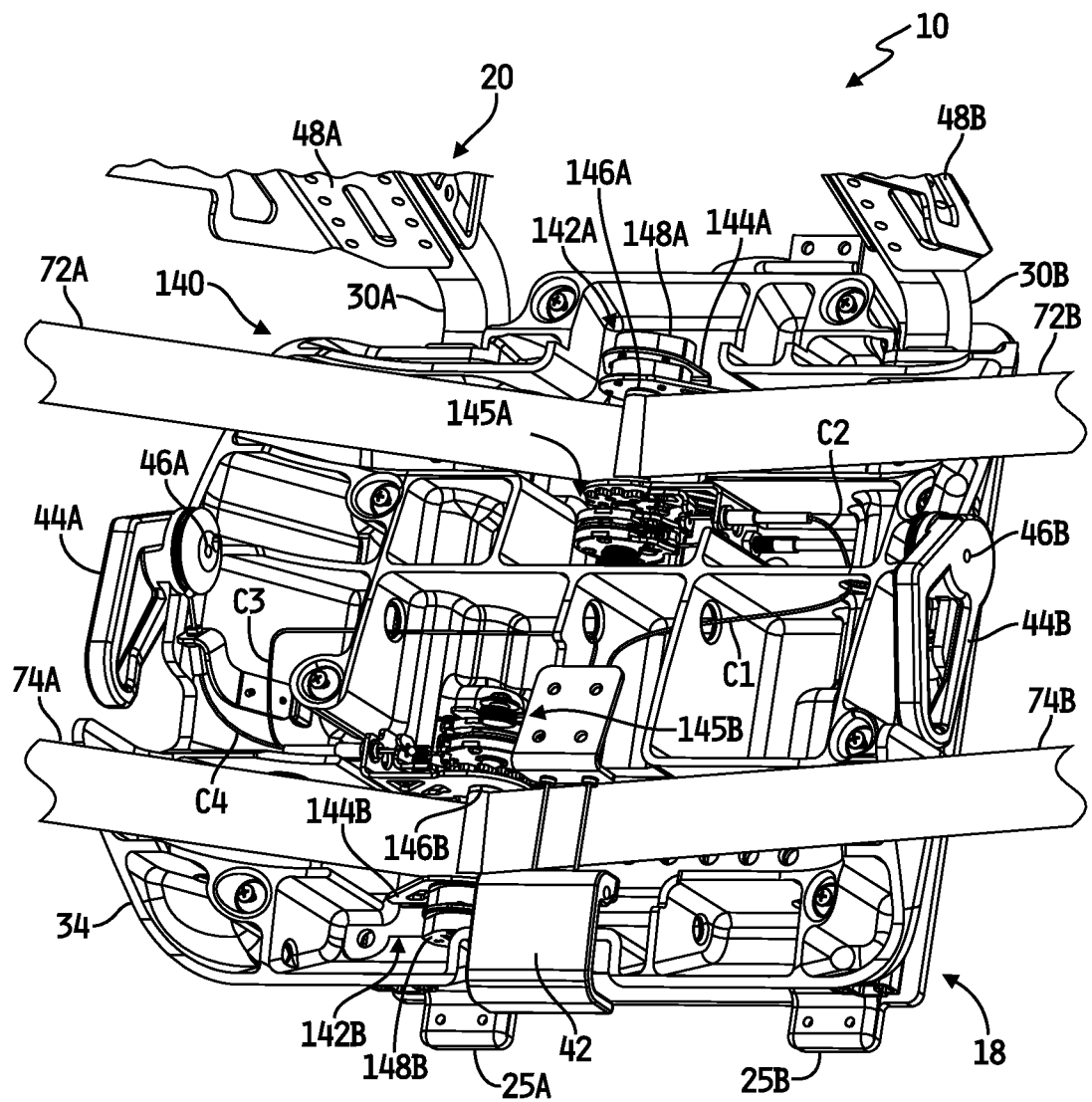
FIG. 8 is a magnified and front perspective view similar to FIG. 7 but with the occupant support panel removed to illustrate an embodiment of a ratcheting web adjustment apparatus for selectively adjusting the lengths of the lap and thigh webs each independently of the other.
Figure 9:
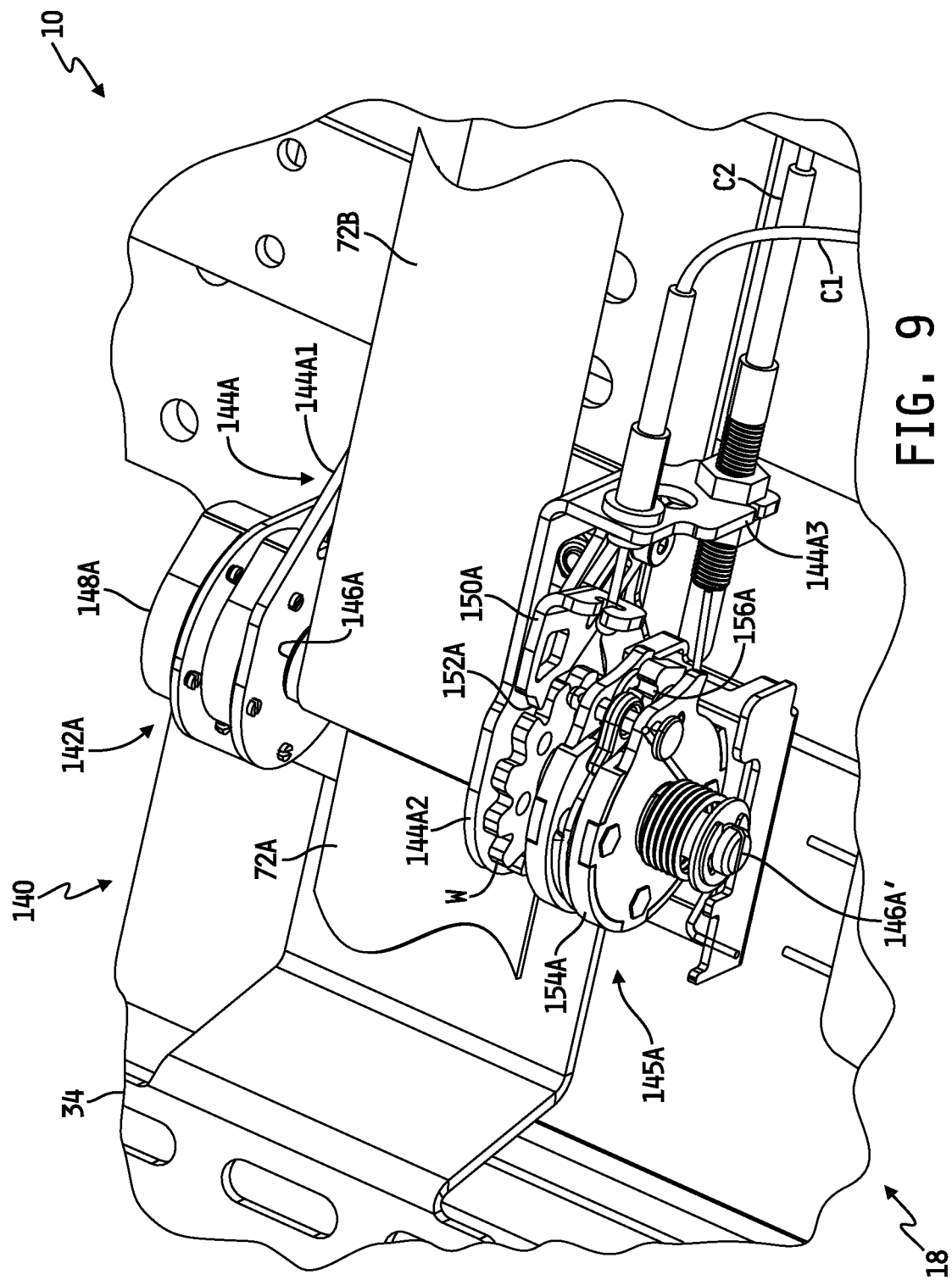
FIG. 9 is a magnified view of an embodiment of one of the ratcheting web retractors of the ratcheting web adjustment apparatus illustrated in FIG. 8.

A ratcheting web adjustment apparatus is illustratively mounted to and within the seat base 34, and a non-limiting example embodiment of such an apparatus 140 is illustrated in FIGS. 7-9, the details of which will be described below. Another non-limiting example of such a ratcheting web adjustment apparatus that may be used with the vehicle seat 10 is illustrated and described in U.S. Pat. No. 9,884,609, which is assigned to the assignee of this disclosure, and the contents of which are expressly incorporated herein by reference in its entirety.

Some of the actuator components of the ratcheting web adjustment apparatus 140 are accessible externally to the seat base 34, and are illustrated in FIGS. 1A-3. A manually actuatable release lever 42, for example, is illustratively mounted centrally along front, top rim of the occupant support panel 36, and manually actuatable ratcheting levers 44A, 44B are mounted on either side of the seat module base 34. The mechanical coupling of the release lever 42 and of the ratcheting levers 44A, 44B to other components of the ratcheting web adjustment apparatus 140, as well as the functionality thereof, will be described in detail below with respect to FIGS. 7-9.

The seat back module 20 illustratively includes a seat back frame 48, as best seen in FIG. 2, mounted, i.e., affixed or attached, to the vehicle seat frame members 30A, 30B, each of which extend upwardly from the seat base module 18 and along either side of the seat back module 20. The seat frame members 30A, 30B are illustratively joined together at their top ends along an upper portion of the rear surface of the seat back module 20 by a cross-frame member 30C. The seat back frame 48 illustratively includes a pair of spaced-apart side frame members 48A, 48B defining the opposite sides of the seat back module 20 and both extending upwardly away from the seat base module 18 to a headrest frame 48D coupled to the top ends thereof. A central seat back frame member 48C, illustratively in the shape of an inverted T, has a lateral frame portion 48C1 extending between and coupled to each of the side frame members 48A, 48B at approximately mid-points thereof, and a longitudinal frame portion 48C2 which extends upwardly toward the cross-frame member 30C from approximately the middle portion of the lateral frame portion 48C1. The top end of the longitudinal frame portion 48C2 is illustratively coupled to the cross-frame member 30C at approximately a mid-point thereof. Opposing upper wing frame members 48E, 48G extend laterally or transversely from opposite sides of the respective side frame members 48A, 48B, and opposing lower wing frame members 48F, 48H also extend laterally or transversely from opposite sides of the respective side frame members 48A, 48B below respective ones of the upper wing frame members 48E, 48G. In the illustrated embodiment, the lower wing frame members 48F, 48H are positioned just above the seat bottom module 18 and are vertically spaced apart from the upper wing frame members 48E, 48G positioned adjacent to the cross-frame member 30C.

Figure 4:
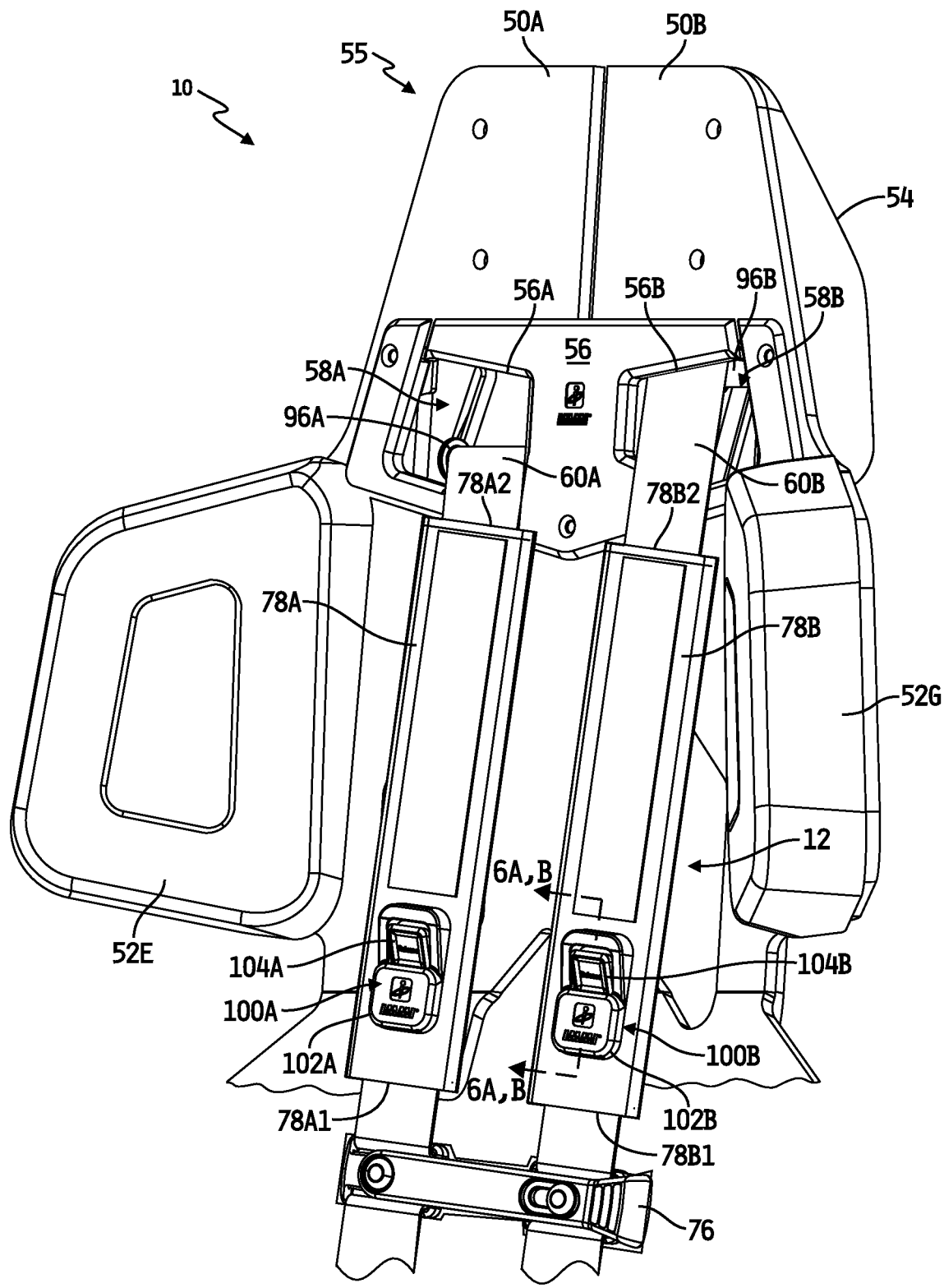
FIG. 4 is a magnified and front perspective view of an upper portion of the seat back of the vehicle seat of FIGS. 1A-3 further illustrating operation of the shoulder web attenuators illustrated in FIG. 3 and illustrating an embodiment of positional adjusters coupled to the shoulder web sleeves shown in FIG. 1A for selectively adjusting positions of the shoulder sleeves relative to the shoulder webs and relative to the vehicle seat back.
Figure 5:
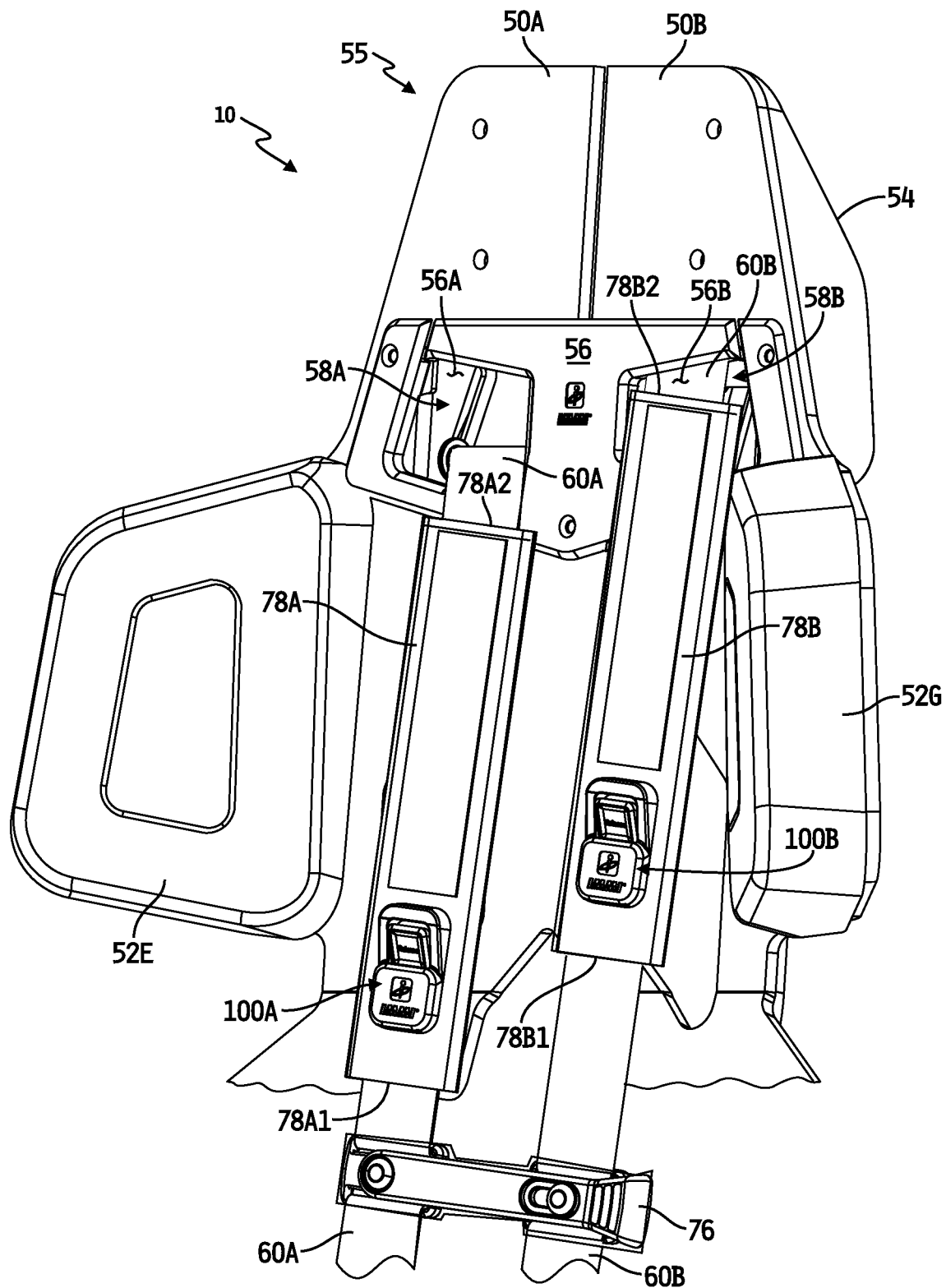
FIG. 5 is a magnified and front perspective view similar to FIG. 4 and illustrating repositioning of one of the shoulder web sleeves via actuation of a corresponding one of the positional adjusters.

Referring now specifically to FIGS. 1A and 1B, a seat back panel 50 is illustratively mounted, i.e., affixed or attached, to the seat back frame 48. The seat back panel 50 illustratively includes two upper side panel sections 50A, 50B each mounted to a respective one of the side frame members 48A, 48B, and two lower side panel sections 50C and 50D likewise mounted to respective ones of the side frame members 48B below the upper side frame members 50A, 50B. Upper portions of the upper side panel sections 50A, 50B together define a headrest panel section 55 mounted to the headrest frame 48D. Opposing upper wing panel members 52E, 52G are mounted to respective ones of the upper wing frame members 48E, 48G, and opposing lower wing panel members 52F, 52H are likewise mounted to respective ones of the lower wing frame members 48F, 48H. A rear headrest cover 54 is illustratively mounted over the rearwardly facing surface of the headrest panel 55 as best shown in FIG. 2. A shoulder web guide plate 56 is illustratively mounted over the forwardly facing surface of the headrest panel 55, and the guide plate 56 defines laterally spaced apart openings 56A, 56B through which respective shoulder webs of the occupant restraint system 12 pass between the front and rear of the seat back module 20. In one embodiment, shoulder web attenuators 58A, 58B are mounted to the seat back frame components 30C, 48D and illustratively to the portions of the seat back panel sections 50A, 50B that form the headrest panel 55. An example of one structural embodiment of the shoulder web attenuators 58A, 58B is illustrated in FIGS. 3-5, and the functionality and operation thereof will be described in detail below.

Upper seat back cushions or pads 52A, 52B are mounted, e.g., affixed or otherwise secured, to respective ones of the upper side panel sections 50A, 50B, and lower seat back cushions or pads 52C, 52D are likewise mounted, e.g., affixed or otherwise secured, to respective ones of the lower side panel sections 50C, 50D. In the illustrated embodiment, the upper seat back cushions 52A, 52B are non-detachably secured to the respective panel sections 50A, 50B, and the lower seat back cushions 52C, 52D are both detachably mounted to the respective panel sections 50C, 50D so as to be removable and/or repositionable. In some alternative embodiments, the upper cushions 52A, 52B may be detachable, and in other alternate embodiments none of the cushions 52A-52D are detachable or repositionable. Wing cushions 52E, 52G, 52F, 52H are affixed to respective ones of the wing panel members 50E, 50G, 50F, 50H, and a head rest cushion 52I is illustratively affixed to the head rest panel section 55. In the illustrated embodiment, the cushions 38, 40A, 40B and 52E-52I are all non-detachably affixed to their respective structures, although in alternate embodiments one or more such cushions may be detachable so as to be replaceable and/or repositionable. The seat back panel 50 is illustratively a rigid material, as is the seat module base 34 and the occupant seat panel 36, and in one embodiment such components are made of one or more conventional rigid plastic materials. In some embodiments, one or more of the seat back panel 50, the seat module base 34 and the occupant seat panel 36 may be structurally reinforced using one or more conventional reinforcing materials. In some embodiments, the upper wings 48E/50E, 48G/50G and/or the lower wings 48F/50F, 48H/50H may be adjustable, e.g., vertically, horizontally and/or semi-flexibly positionable.

The occupant restraint system 12 is a multi-point restraint system and in this regard the restraint system 12 may be configured to have two or more points of restraint. In the illustrated embodiment, the restraint system 12 is a 6-point restraint system, although in alternate embodiments the restraint system 12 may be configured to have more or fewer points of restraint. Referring to FIGS. 1A and 1B in particular, the illustrated occupant restraint system 12 includes two shoulder webs 60A, 60B each extending through a respective one of the openings 56A, 56B in the shoulder web guide plate 56. One end of each web 60A, 60B extends and downwardly along the rear surface of the seat back module 20 and is illustratively coupled to a Y-connector 62. One end of another web 60C is also coupled to the Y-connector 62 and an opposite end is operatively coupled to a conventional web retractor 64 mounted to the seat back frame 48 adjacent to the seat base 14. In alternate embodiments, the Y-connector 62 may be omitted and each of the shoulder webs 60A, 60B may be coupled to a respective one of two conventional web retractors mounted to the seat back frame 48. As depicted by example in FIG. 1B, mounting structures 66A, 66B are provided on the seat back frame 48 for this purpose. The web retractors 64 (or two web retractors in alternate embodiments) are illustratively conventional inertial locking retractors. In one embodiment, the web retractor 64 is provided in the form of conventional automatic locking retractor (ALR), although in alternate embodiments the web retractor 64 may be provided in the form of a conventional emergency locking retractor (ELR) or other suitable inertial locking retractor.

The opposite ends of the webs 60A, 60B are each coupled to a respective one of a pair of web attachments members 68A, 68B. Between the web attachment members 62A, 62B and the web retractor 64, the shoulder webs 60A, 60B each pass through the guide plate 56 as described above, and each is supported on and by a respective one of the shoulder web attenuators 58A, 58B. The shoulder web attenuators 58A, 58B are each illustratively configured to attenuate movement of the shoulder webs 60A, 60B during operation of the motor vehicle as will be described in detail below. The shoulder web 60A thus extends upwardly from the Y-connector 62 along the back side of the seat back module 20, through the web attenuator 58A, through the seat back panel 50 and then downwardly along the front side of the seat back module 20 and into engagement with the web attachment member 68A. The shoulder web 60B likewise extends upwardly from the Y-connector 62 along the back side of the seat back module 20, through the web attenuator 58B, through the seat back panel 50 and then downwardly along the front side of the seat back module 20 and into engagement with the web attachment member 68B. The shoulder webs 60A, 60B thus run substantially parallel with and spaced apart from one another so as to extend over respective shoulders and downwardly along a torso of an occupant seated in the vehicle seat 10.

Adjacent to the front portion of the seat back panel 50 through which the shoulder webs 60A, 60B pass, the shoulder web 60A passes through an elongated web sleeve or pad 78A and the shoulder web 60B likewise passes through another elongated web sleeve or pad 78B. A cross strap 76 is illustratively affixed to the shoulder web 60A between the sleeve or pad 78A and the web attachment member 68A, and the cross strap 92 is configured to be releasably secured to the shoulder web 60B as illustrated by example in FIG. 1A. The positions of the web sleeves 78A, 78B relative to the shoulder webs 60A, 60B are illustratively each independently adjustable along a respective one of the shoulder webs 60A, 60B as will be described in detail below with respect to FIGS. 4-6B.

The illustrated occupant restraint system 12 further includes two lap webs 72A, 72B each coupled at one end to a respective one of the web attachment members 68A, 68B. The lap webs 72A, 72B each extend through the occupant support panel 36 and into engagement with the ratcheting web adjustment apparatus 140 as will be described in detail below. In the illustrated embodiment, the lap webs 72A, 72B comprise a single length of web operatively coupled to apparatus 140, although in other embodiments the lap webs 72A, 72B may be separate from one another.

The illustrated occupant restraint system 12 further includes two thigh restraint webs 74A, 74B each coupled at one end to a respective one of the web attachment members 68A, 68B. The thigh webs 74A, 74B each extend through the occupant support panel 36 and into engagement with the ratcheting web adjustment apparatus 140 as will be described in detail below. In the illustrated embodiment, the thigh webs 74A, 74B comprise a single length of web operatively coupled to apparatus 140, although in other embodiments the thigh webs 74A, 74B may be separate from one another. Operation of the ratcheting web adjustment apparatus will be described in detail below with respect to FIGS. 7-9.

The restraint system 12 further includes engagement members 70A, 70B mounted to or integral with respective ones of the web attachment members 68A, 68B. In the illustrated embodiment, the engagement member 70A is or includes a conventional tongue and the engagement member 70B is or includes a conventional buckle, wherein the tongue of the tongue member 70A is releasably engageable with and to the buckle of the buckle member 70B. In some alternate embodiments, the engagement member 70A may be the buckle member and the engagement member 70B may be the tongue member. In any case, the engagement members 70A, 70B are releasably engageable with and to one another to releasably couple the web attachment members 68A, 68B together as illustrated in FIG. 1A.

Referring now to FIG. 3, an embodiment of the web attenuators 58A, 58B is illustrated by example, along with an engagement assembly 80 configured to releasably engage an embodiment of a seat restraint system for restraining movement, e.g., pivoting and forward sliding, of the vehicle seat 10. Embodiments of the seat restraint system will be described in detail below with respect to FIGS. 10-12. The engagement assembly 80 illustratively includes a bracket or plate 82 mounted flush to the rear surface of the headrest panel 55. Coupled to or integral with the bracket or plate 82 is a tongue member 84 which extends generally rearwardly away from the rear surface of the headrest 55. In the illustrated embodiment, the tongue member 84 extends from the top end of the bracket or plate 82 at a generally acute angle relative to vertical, although in alternate embodiments this angle may be non-acute. In any case, the tongue member 84 is conventional and is configured to releasably engage a conventional buckle member forming part of the seat restraint system as will be described below with respect to FIGS. 10-12. In alternate embodiments, the buckle member may be coupled to the bracket or plate 82 and the tongue member 84 may form part of the seat restraint system.

In the embodiment illustrated in FIG. 3, the web attenuators 58A, 58B each operatively mounted to the seat back module 20 and are each illustratively configured to independently attenuate downward movement of a respective one of the shoulder webs 60A, 60B, i.e., downward movement of the web(s) 60A and/or 60B toward the shoulders of the seat occupant, during operation of the motor vehicle in which the vehicle seat 10 is mounted. In the illustrated embodiment, and referring also to FIG. 4, the guide plate 56 defines laterally spaced apart openings 56A, 56B therethrough just below the head rest panel 55 through which the shoulder webs 60A, 60B extend as described above. The web attenuator 58A illustratively includes opposing brackets 86A and 88A mounted to the headrest 55 alongside respective opposing sides of the opening 56A defined through the guide plate 56. The web attenuator 58B likewise illustratively includes opposing brackets 86B and 88B mounted to the headrest 55 alongside respective opposing sides of the opening 56B defined through the guide plate 56. In the illustrated embodiment, the brackets 86A, 86B are integral with the bracket 82 such that the brackets 82, 86A and 86B are of uniform construction. In alternate embodiments, the bracket 86A and/or the bracket 86B may be separate from the bracket 82. In any case, the brackets 86A, 88A and 86B, 88B are illustratively parallel with one another and each extends rearwardly from the headrest panel 55 on opposite sides of the respective openings 56A, 56B. The brackets 86A, 88A each define respective opposed slots or channels 92A, 94A each illustratively extending at an cute angle relative to vertical from a lower portion of the respective bracket 86A, 88A upwardly to a mid-portion of the respective bracket 86A, 88A. The brackets 86B, 88B likewise each define respective opposed slots or channels 92B, 94B each illustratively extending at an cute angle relative to vertical from a lower portion of the respective bracket 86B, 88B upwardly to a mid-portion of the respective bracket 86B, 88B.

A rod or shaft 90A is mounted to and between the brackets 86A, 88A adjacent to or near a top of the opening 56A, and a rod or shaft 90B is likewise mounted to and between the brackets 86B, 88B adjacent to or near the opening 56B. Opposing ends of another rod or shaft 96A are received within respective slots 92A, 94A of the brackets 86A, 88A, and opposing ends of yet another rod or shaft 96B are received within respective slots 92B, 94B of the brackets 86B, 88B. The rod or shaft 96A thus extends transversely across the opening 56A between the two brackets 86A, 88A, and is movable along the slots 92A, 94A between the terminal ends of the slots 92A, 94A. The rod or shaft 96B likewise extends transversely across the opening 56B between the two brackets 86B, 88B, and is movable along the slots 92B, 94B between the terminal ends of the slots 92B, 94B. A resilient member 98A is coupled between the rod or shaft 90A and the rod or shaft 96A at or near respective ends thereof adjacent to an outer surface of the bracket 88A, and another resilient member 98B is coupled between the rod or shaft 90A and the rod or shaft 96A at or near respective opposite ends thereof adjacent to an outer surface of the bracket 86A, wherein the outer surfaces of the brackets 86A, 88A are those facing away from each other and away from the opening 56A. Another resilient member 98C is coupled between the rod or shaft 90B and the rod or shaft 96B at or near respective ends thereof adjacent to an outer surface of the bracket 88AB, and still another resilient member 98D is coupled between the rod or shaft 90B and the rod or shaft 96B at or near respective opposite ends thereof adjacent to an outer surface of the bracket 86B, wherein the outer surfaces of the brackets 86B, 88B are likewise those facing away from each other and away from the opening 56B. Although the rod or shaft 90A acts to securely couple the brackets 86A, 88A to one another and the rod or shaft 90B likewise acts to securely couple the brackets 86B, 88B to one another, it is not essential to the functionality of the web attenuators 58A, 58B to extend the rods or shafts 90A, 90B transversely between the respective brackets. In some alternate embodiments, then, the rods or shafts 90A, 90B may be replaced with simple structures mounted to or integral with the outer surfaces of the brackets 86A, 86B, 88A, 88B suitable for securing a respective one of the resilient members 98A-98D thereto.

The resilient members 98A-98B illustratively operate to suspend the rods or shafts 96A, 96B from the ends of the respective rods or shafts 90A, 90B such that the rod or shaft 96A is moveable within the slots 92A, 94A under bias of the resilient members 98A, 98B and the rod or shaft 96B is moveable within the slots 92B, 94B under bias of the resilient members 98C, 98D. As illustrated in FIGS. 3 and 4, the shoulder web 60A extends through the opening 56A of the guide plate 56 and is supported by the rod or shaft 96A suspended from the ends of the rod or shaft 90A by the resilient members 98A, 98B, and the shoulder web 60B extends through the opening 56B of the guide plate 56 and is supported by the rod or shaft 96B suspended from the ends of the rod or shaft 90B by the resilient members 98C, 98D. The resilient members 98A, 98B and 98C, 98D operate to attenuate downward forces applied by the shoulder webs 60A, 60B to the respective rods or shafts 96A, 96B under dynamic operating conditions of the motor vehicle in which the vehicle seat 10 is mounted. Illustratively, the resilient force of the of the resilient members 98A-98D, i.e., the amount of downward force required to be applied by the respective webs 60A, 60B between the rods or shafts 90A, 90B and the rods or shafts 96A, 96B to move the rods or shafts 90A, 90B a unit distance from one another within the respective slots 92A, 94A and 92B, 94B, may be selected based on the application. In some embodiments, for example, resilient members 98A-98D of different resilient force may be readily available, and may be selected accordingly. Alternatively or additionally, multiple resilient members 98A-98D per bracket side may be used in either or both of the web attenuators 58A, 58B to achieve a desired resilient force.

In the illustrated embodiment, the resilient members 98A-98D are provided in the form of O-rings or rings of other shapes formed of one or more suitable resilient materials such as rubber, latex, or the like. In other embodiments, the resilient members 98A-98D may be provided in the form of linear, non-linear or piecewise liner shapes of one or more conventional resilient materials. In some such alternate embodiments, the one or more conventional biasing members may be or include one or more conventional springs, e.g., one or more linear or non-linear coil springs, flat springs and/or wire forms embodied as one or more compression springs, one or more extension springs, one or more torsion springs, one or more constant force springs or the like, or any combination thereof. Alternatively or additionally, the one or more biasing members may be or include one or more conventional shock absorbing or shock dampening devices, e.g., such as one or more conventional dashpots, of hydraulic, pneumatic and/or mechanical design. In any case, the one or more biasing members may be selected or designed to have any desired linear or non-linear, constant or non-constant, biasing force(s) to achieve any desired dampening or spring rate.

It will be noted that the acute angle defined by the opposed pairs of slots 92A, 94A and 92B, 94B is selected to at least approximately match an angle at which the shoulder webs 60A, 60B exit the openings 56A, 56B of the guide plate 56 due to the shoulder webs 60A, 60B, in operation, being forced horizontally away from the front surface of the seat back module 20 by a distance corresponding to the thickness of the torso of the seat occupant. In one embodiment, the acute angle is selected to match an approximate torso thickness of an average sized occupant. Other applications will require other considerations as to the angle relative to vertical, if any, of the slots 92A, 94A and 92B, 94B.

Referring now to both FIG. 3 and FIG. 4, the shoulder web 60B illustratively represents static operating conditions of the motor vehicle in which the vehicle seat 10 is mounted and of the occupant being restrained by the restraint system 12. Under such static operating conditions, the vehicle is not imparting any movement to the seat 10, the occupant or the shoulder web 60B, and the occupant is stationary and seated normally in the vehicle seat 10 so as to not impart any outward or other forces on the shoulder web 60B. Under such conditions, no downward force is being applied by the shoulder web 60B to the rod or shaft 96B and the resilient members 98C, 98D are therefore unstretched. In this example, the dimensions and resilient force of the resilient members 98C, 98D have been selected such that, under such static conditions, the rod or shaft 96B supporting the shoulder web 60B thereon is at or near the top of the opening 56B defined through the guide plate 56. In other embodiments, the resilient members 98C, 98D may be selected so as to place the rod or shaft 96B supporting the shoulder web 60B at any desired position within the opening and relative to the rod or shaft 90B.

The shoulder web 60A in FIGS. 3 and 4 illustratively represents a dynamic operating condition of the motor vehicle in which the vehicle seat 10 is mounted and/or of the occupant being restrained by the restraint system 12. Under such a dynamic operating condition, caused by the terrain being traversed by the motor vehicle, an impact of the motor vehicle with another object, or simply by erratic movement of the occupant of the vehicle seat 10, substantial downward force is being applied by the shoulder web 60A to the rod or shaft 96A which has caused the rod or shaft 96A to travel to the terminal ends of the slots 92A, 94A and stretch, i.e., elongate, the resilient members 98C, 98D in the process. Between the two extremes illustrated by example in FIGS. 3 and 4, some dynamic operating conditions may cause the webs 60A, 60B to exert various downward forces on the rods or shafts 96A, 96B which will temporarily cause the resilient members 98A, 98B and/or the resilient members 98C, 98D to temporarily stretch, i.e., elongate, but to then return to their static positions once the dynamic operating condition has passed.

In the illustrated embodiment, each rod or shaft 96A, 96B is movable therein between an upper and lower positions thereof as defined by the dimensions of the respective slots 92A, 94A and 92B, 94B and the resilient force and dimensions of the resilient members 98A-98D. In the illustrated embodiment, the slots 92A, 94A and 92B, 94B are linear and the rods or shafts 96A, 96B accordingly move linearly therein. In other embodiments, the slots 92A, 94A and/or 92B, 94B be non-linear or piece-wise linear, and movement the rods or shaft 96A, 96B in such embodiments will move non-linearly or piecewise linearly therein. In one embodiment, the rods or shafts 96A, 96B are each illustratively biased upwardly within the respective openings 56A, 56B, such that with no downward force applied either of the shoulder webs 60A, 60B the rods or shafts 96A, 96B are both in their upper positions as illustrated by the rod or shaft 96B in FIGS. 3 and 4. A downward force applied to either or both of the shoulder webs 60A, 60B in excess of the upwardly directed biasing force drives the respective rod or shaft 96A, 96B downwardly against the biasing force at least partially toward the lower position(s) of the rods or shafts 96A, 96B relative to the slots 92A, 94A and/or 92B, 94B. A downward force of sufficient magnitude applied to either or both of the shoulder webs 60A, 60B will drive the respective rod or shaft 96A, 96B downwardly against the biasing force to the lowest position(s) of the rod or shaft(s) 96A, 96B relative to the slots 92A, 94A and/or 92B, 94B. The upwardly directed biasing force applied by the resilient members 98A-98D to the rods or shafts 96A, 96B thus acts to attenuate forceful downward movement of the respective shoulder webs 60A, 60B, thereby absorbing at least some amount of the shock force applied to the shoulder webs 60A, 60B during various dynamic operating conditions of the motor vehicle in which the vehicle seat 10 is mounted. In some alternate embodiments, the rods or shafts 96A, 96B may be biased to a "center" position between their upper and lower positions. In such embodiments, pairs of the rods or shafts 96A, 96B may positioned in the slots 92A, 94A and 92B, 94B with the shoulder webs 60A, 60B passing between each respective set and with each pair biased both upwardly and downwardly against the brackets 86A, 88A and/or 86B, 88B such that a downward force of sufficient magnitude applied to either or both of the shoulder webs 60A, 60B will drive the respective rod or shaft 96A, 96B downwardly against the biasing force toward or to the lower position(s) thereof, and such that an upward force of sufficient magnitude applied to either or both of the shoulder webs 60A, 60B will drive the respective rod or shaft 96A, 96B upwardly against the biasing force toward or to the upper position(s) thereof.

It will be understood that in embodiments of the vehicle seat 10 in which the shoulder webs 60A, 60B do not pass through the seat back module 20 but instead pass over the top of the seat back module 20, e.g., on either side of the head rest 55, the shoulder web attenuators 58A, 58B may be mounted to the seat back module 20 in a manner that positons them above the top of the seat back panel 50 on either side of the head rest panel 55.

Referring now to FIGS. 4-6, the web sleeves 78A, 78B are each independently adjustable along a respective one of the shoulder webs 70A, 70B to selectively position a respective sleeve 78A, 78B relative to a shoulder of an occupant of the vehicle seat 10 and/or relative to the seat back 20. In the illustrated embodiment, the web sleeves 78A, 78B are elongated sleeves each having one respective end $78A_1$, $78B_1$ facing toward the cross strap 76 and an opposite respective end $78A_2$, $78B_2$ facing toward the web guide plate 56 (or other structure which defines the front surface of the seat back module 20 into which the shoulder webs 60A, 60B extend).

Each web sleeve 78A, 78B includes a respective sleeve position adjuster 100A, 100B operatively coupled thereto and illustratively positioned adjacent to a respective end $78A_1$, $78B_1$ thereof. In alternate embodiments, the sleeve position adjuster 100A and/or the sleeve position adjuster 100B may be positioned elsewhere along the respective web sleeve 78A, 78B. Each sleeve position adjuster 100A, 100B includes a housing 102A, 102B mounted, i.e., attached, affixed or otherwise secured to a respective one of the web sleeves 78A, 78B, and an actuator 104A, 104B, e.g., in the form of a button, lever or other conventional actuator, which is manually actuatable between a normal, unactuated position in which the actuator 104A, 104B engages a portion of a respective one of the shoulder webs 60A, 60B to secure, i.e., clamp, the portion of the shoulder web 60A, 60B and thus fix the position of the sleeve 78A, 78B relative to the shoulder web 60A, 60B, and an actuated position in which the actuator 104A, 104B disengages from the shoulder web 60A, 60B to thus allow the sleeve 78A, 78B to be moved along the respective shoulder web 60A, 60B. In the unactuated or clamped position of the actuator 104A, the position of the respective actuator 104A, 104B, and thus the position of the respective web sleeve 78A, 78B, relative to the respective shoulder web 60A, 60B, is fixed. In the actuated or unclamped position of the actuator 104A, 104B, the respective actuator 104A, 104B, and thus the respective web sleeve 78A, 78B is movable, e.g., slidable, along the respective shoulder web 60A, 60B so as to be adjustably positionable relative to the respective shoulder web 60A, 60B.

Figure 6A:
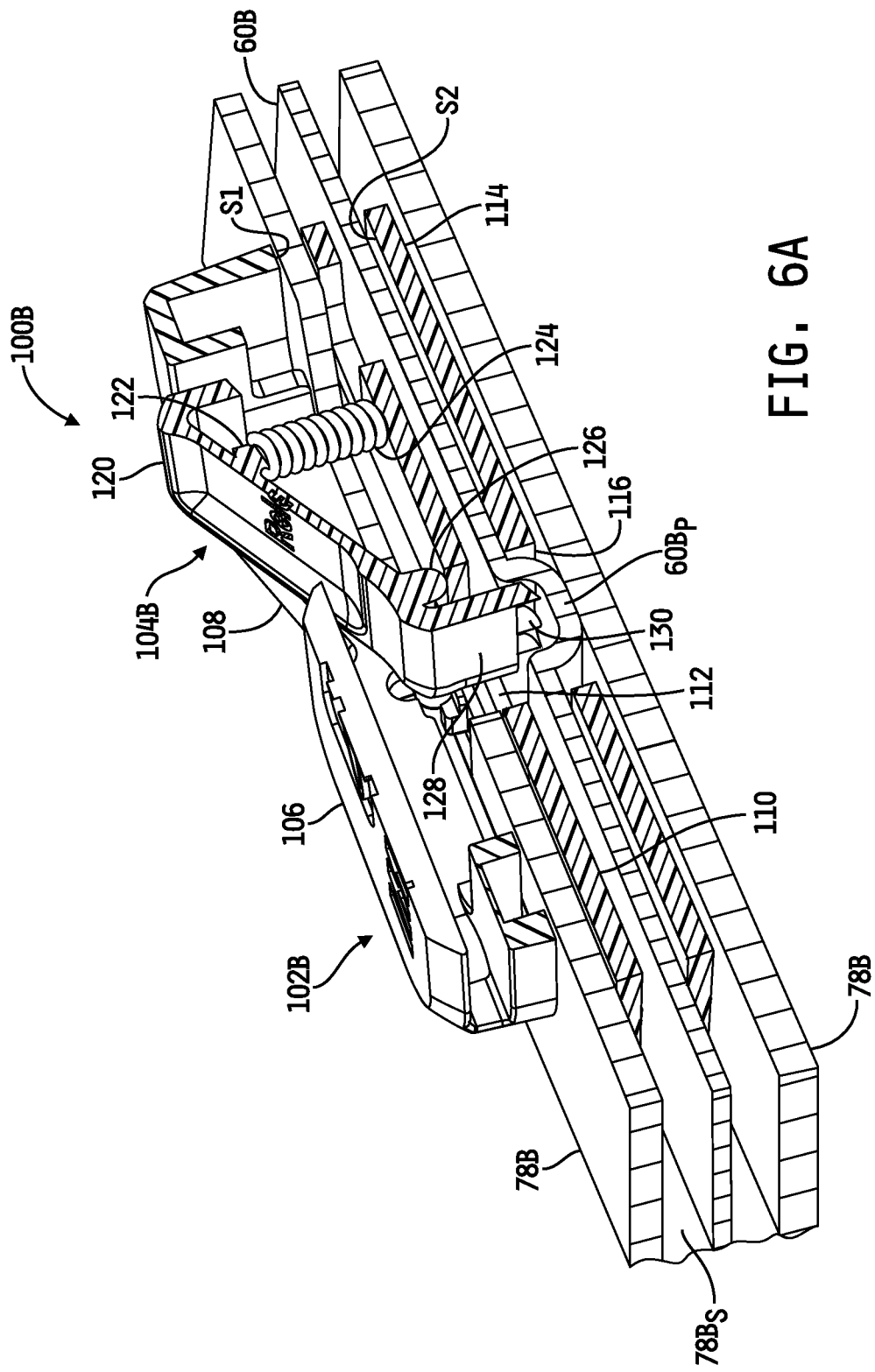
FIG. 6A is a cross-sectional view of one of the shoulder web sleeve positional adjusters illustrated in FIGS. 4 and 5 as viewed along section lines 6A,B-6A,B of FIG. 4 and illustrating an unactuated state of the positional adjuster in which the positional adjuster engages a portion of the shoulder web passing through the sleeve to thereby fix the position of the respective sleeve relative to the shoulder web.
Figure 6B:
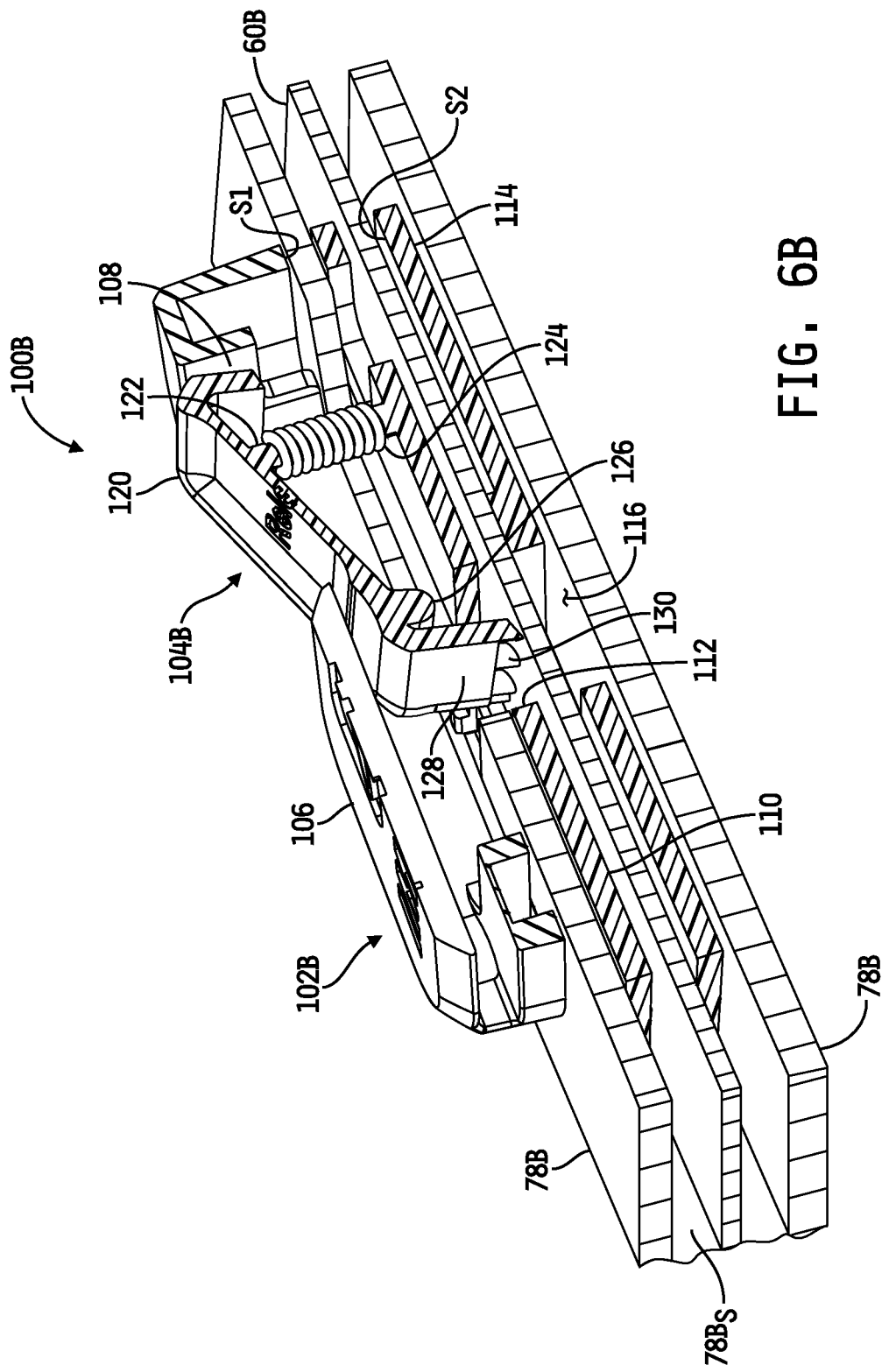
FIG. 6B is a cross-sectional view similar to FIG. 6A and illustrating an actuated state of the positional adjuster in which the positional adjuster does not engage the shoulder web passing through the sleeve so that the sleeve may be moved along the shoulder web and relative to the seat back.

Referring to FIGS. 6A and 6B, an embodiment of the sleeve position adjuster 100A, 100B (illustrated with respect to the adjuster 100B) is shown in cross section. FIG. 6A depicts the unactuated, or clamped, positon of the actuator 104A, and FIG. 6B depicts the actuated, or unclamped position of the actuator 104A. In the illustrated embodiment, the housing 102B of the sleeve positon adjuster 100B includes an upper housing member 106 which defines an opening 108 sized to receive the actuator 104B therein. An upper wall 110 runs substantially parallel with the housing member 106 and defines an opening 112 sized to receive a web clamping portion 128 of the actuator 104B therein. A space S1 is defined between the housing member 106 and the upper wall 110, and the width of the space S1 is selected so as to receive a wall of the sleeve 78B therein as shown. A lower wall 112 runs substantially parallel with the upper wall 110 and defines an opening 116 that aligns with the opening 112 in the upper wall. In one embodiment, the openings 112 and 116 are dimensionally the same and are juxtaposed relative to one another. In alternate embodiments, the openings 112 and 116 may have different dimensions and/or may be at least partially offset from one another. In any case, a space S2 is defined between the upper and lower walls 110, 114 having a width selected so as to receive the thickness of the shoulder web 60B therethrough as shown. The sum of the widths of the spaces S1 and S2, taking into account the thicknesses of the upper and lower walls 110, 112, to be received with the inner space $78B_S$ defined by the sleeve 78B. In the illustrated embodiment, the sleeves 78A, 78B are configured to be closed structures defining inner spaces that wrap completely around or about the shoulder webs 60A, 60B. In alternate embodiments, the sleeve 78A and/or the sleeve 78B may be configured to wrap only partially about the shoulder web(s) 60A and/or 60B.

The actuator 104B illustratively includes a lever portion 120 that is sized to be received within the opening 108. A post 122 extends downwardly from the lever 120 and receives a biasing member 124 positioned between the lever portion 120 and a top surface of the upper wall 110. The web clamping portion 128 of the actuator 104B extends downwardly from one end of the lever portion 120 and into the aligned openings 112, 116 as illustrate in FIG. 6A in the unactuated position of the actuator 104B. In some embodiments, teeth 130 are provided at the terminal end of the web clamping portion 128 to facilitate clamping engagement of the actuator 104B with the shoulder web 60B. In some embodiments, as illustrated by example in FIG. 6A, the actuator 104B includes a stop 126 sized to contact the top surface of the upper wall 110 in the clamped position of the actuator 104B to limit the depth of penetration of the web clamping portion into the aligned openings 112, 116. The actuator 104B is illustratively configured such that the exposed end of the lever portion 120 protrudes upwardly out of the opening 108 in the unactuated positon of the actuator 104B, although in other embodiments the lever portion 120 may be flush with or recessed within the opening 108.

In the unactuated or clamped position of the actuator 104B, the biasing member 124 exerts an upward biasing force to the underside of the lever portion 120 at or near the free end thereof which drives the clamping portion 128 of the actuator 104B into and through the aligned openings 112, 116 and into engagement with the shoulder web 60B as illustrated by example in FIG. 6A. The biasing force of the biasing member 124 is illustratively selected so as to cause the clamping portion 128 of the actuator 104B to drive a portion $60B_P$ of the shoulder web 60B at least partially into the opening 116, thereby effectively trapping the portion $60B_P$ of the shoulder web 60B in the opening 116 and fixing the position of the actuator 104B, and thus of the sleeve position adjuster 100B and the sleeve 78B, relative to the shoulder web 60B. In the actuated or clamped position of the actuator 104B, a downward force is applied to the free end of the lever portion 120 that is of sufficient magnitude to overcome the biasing force of the biasing member 124. This downward force moves the free end of the lever portion 120 into the opening 108, thereby driving the clamping portion 128 upwardly and away from the opening 116 as illustrated by example in FIG. 6B. In this position, the clamping portion 128 of the actuator 104B is disengaged from the shoulder web 60B, and the sleeve position adjuster 100B as well as the sleeve 78B may therefore be moved along the shoulder web 60B. In some embodiments, the clamping portion 128 may remain in contact with the shoulder web 60B in the actuated or unclamped position of the actuator 104B, but in such embodiments any force applied by the clamping portion to the shoulder web 60B is not sufficient to prevent movement of the sleeve position adjuster 100B, and thus the sleeve 78B, along the shoulder web 60. For purposes of this disclosure, then, the phrase "the clamping portion 128 of the actuator 104B is disengaged from the shoulder web 60B" when used in the context of the actuated or unclamped position of the actuator 104B will be understood to mean that the clamping portion 128 may not be in contact with the shoulder web or that the clamping portion 128 may be in contact with the shoulder web 60B but not with sufficient force to prevent movement of the actuator 104B and the sleeve 78B relative to the shoulder web 60B.

Referring again to FIGS. 4 and 5, the sleeve 78B is shown in a lower position relative to the shoulder web 60B in FIG. 4, i.e., with the end 78B1 adjacent to the cross strap 76. In FIG. 5, the actuator 104B of the sleeve position adjuster 100B has been manually moved from the normal unactuated, clamped position to the actuated, unclamped position and, with the actuator 104B maintained in the actuated position, the sleeve 78B has been moved upwardly along the shoulder web 60B to position the end 78B2 adjacent to the opening 56B in the guide plate 56. Thereafter, the actuator 104B was released, which caused the actuator 104B to automatically return to the unactuated, clamped position thereof to fix the position of the sleeve 78B relative to the shoulder web 60B.

It will be understood that whereas the web sleeves 78A, 78B are illustrated in the attached figures and described above as being received on the shoulder webs 60A, 60B of the restraint system 12, either or both of the web sleeves 78A, 78B may alternatively or additionally be provided on any of the webs or pairs of webs of the restraint system 12.

Referring now to FIGS. 7-9, operation of the ratcheting web adjustment apparatus 140 will be described. As briefly described above, the ratcheting web adjustment apparatus 140 is configured to selectively (and independently) tighten, i.e., by reducing the length of, the lap web(s) 72A, 72B and/or the thigh web(s) 74A, 74B. In this regard, the apparatus 140 illustratively includes at least two manually ratcheting web retractors operatively mounted therein. Each such manually ratcheting web retractor is illustratively conventional and includes a spool about which a web is wound, at least one toothed gear or wheel mounted to rotate with the spool and a conventional locking mechanism, e.g., a conventional locking pawl which, when engaged with the at least one toothed gear or wheel (i.e., in its locked position), prevents rotation of the spool in the web payout direction but allows manual ratcheting of the spool in the web take-up direction to incrementally take up web on the spool while also preventing payout of the web such that the web is tightened by reducing its length. Each such ratcheting web retractor is further rotationally biased in the web take-up direction such that, when the locking mechanism is disengaged from the at least one toothed gear or wheel (i.e., in its unlocked position), the spool rotates under the bias in the web take-up direction to automatically take up web on the spool. With the locking mechanism disengaged, i.e., unlocked, the spool can be made to rotate in the web payout direction by applying a force to the web in the web payout direction that is greater than the biasing force to thereby pay out web from the retractor.

In the illustrated embodiment, the ratcheting web adjustment apparatus 140 includes two ratcheting web retractors of the type just described. One is coupled via at least one web to the lap web(s) 72A, 72B, and the locking/release mechanism thereof is operatively coupled to the release lever 42. The at least one toothed gear or wheel of this ratcheting web retractor is operatively coupled to the manually actuatable lever 44A mounted on one side of the seat module base 34. In some alternate embodiments, the at least one toothed gear or wheel of this ratcheting web retractor may instead be operatively coupled to the manually actuatable lever 44B mounted on the opposite side of the seat module base 34. The lap web 72A illustratively enters and exits the seat module base 34 via a slot 36B2 defined through a top edge 36B1 of the side wall 36B of the occupant seat panel 36, and the lap web 72B illustratively enters and exits the seat module base 34 via a slot 36C2 defined through a top edge 36C1 of the side wall 36C of the occupant seat panel 36, as illustrated by example in FIG. 7. The other ratcheting web retractor is coupled via at least one web to the thigh web(s) 74A, 74B, and the locking mechanism thereof is also operatively coupled to the release lever 42. The at least one toothed gear or wheel of this ratcheting web retractor is operatively coupled to the manually actuatable lever 44B mounted on one side of the seat module base 34, although in some alternate embodiments the at least one toothed gear or wheel of this ratcheting web retractor may instead be operatively coupled to the manually actuatable lever 44A mounted on the opposite side of the seat module base 34. The thigh web 74A illustratively enters and exits the seat module base 34 via a slot 36B3 defined through the top edge 36B1 of the side wall 36B of the occupant seat panel 36, and the thigh web 74B illustratively enters and exits the seat module base 34 via a slot 36C3 defined through the top edge 36C1 of the side wall 36C of the occupant seat panel 36, as illustrated by example in FIG. 7.

The release lever 42 is illustratively operable to simultaneously control the locking states of the locking mechanisms of each ratcheting web retractor of the apparatus 140. In the default position of the lever 42 illustrated in FIGS. 1 and 7, the locking mechanism are in their locked positions to thereby prevent rotation of the web spools in the web payout direction. The lever 42 may be manually actuated, e.g., by pulling upwardly on the lever 42, to cause both locking mechanisms to move to their unlocked positions, thereby allowing web payout from and web retraction within the respective retractors. Upon release of the lever 42, it illustratively returns to the position shown in FIGS. 1 and 7 which simultaneously causes both locking mechanisms to move back to their locked positions, thereby preventing web payout from the respective retractors. It will be understood that the lever 42 may take other conventional forms, and/or be located elsewhere on the vehicle seat 10. In some embodiments, the lever 42 may be provided in the form of two separate levers; one for controlling the locking state of one of the retractors and one for controlling the locking state of the other retractor.

The manually actuatable levers 44A, 44B are each configured to be manually actuated in a manner that causes incremental rotation of the toothed gear(s) of a respective one of the ratcheting web retractors of the apparatus 140 to thereby take up slack, i.e., reduce the length of, the respective web coupled to the respective lap web(s) 72A, 72B or thigh web(s) 74A, 74B, thereby reducing or displacing the length thereof in a manner which tightens the respective lap web(s) 72A, 72B or thigh web(s) 74A, 74B about the occupant. In one embodiment of the apparatus 140 in which the lap webs 72A, 72B are provided in the form of a single length of web and in which the thigh webs 74A, 74B are likewise provided in the form of a single length of web, ratcheting of one of the ratcheting web retractor mounted in the seat module base 34 reduces the length of a web coupled to the single lap web which, in turn, displaces a portion of the single lap web within the seat module base 34, thereby tightening the single lap web about the lap of the occupant of the vehicle seat 10. Likewise, ratcheting of the other ratcheting web retractor mounted in the seat module base 34 reduces the length of another web coupled to the single thigh web which, in turn, displaces a portion of the single thigh web within the base 34, thereby tightening the single thigh web about the thighs of the occupant of the vehicle seat 10. In some alternate embodiments, the apparatus 140 may be configured such that ratcheting of one or more web retractors causes shortening, and therefore tightening, of the one or more lap webs 72A, 72B and such that ratcheting of one or more other web retractors causes shortening, and therefore tightening, of the one or more thigh webs 74A, 74B.

In any case, each manually actuatable lever 44A, 44B is operatively coupled to the toothed gear(s) or wheel(s) of a respective ratcheting web retractor of the apparatus, and is configured to be manually actuated in a manner which causes incremental rotation of the respective toothed gear(s) or wheel(s) in the web take-up direction, thereby tightening a respective one of the lap web(s) 72A, 72B and the thigh web(s) 74A, 74B about the occupant. In the illustrated embodiment, each lever 44A, 44B is rotatable about a respective pivot point 46A, 46B between a lower position, and an upper position. In some embodiments, the lower position is the default position, and each lever 44A, 44B is illustratively biased to the lower position. Alternatively, the upper position may be the default position and each lever 44A, 44B may be biased to the upper position. In other alternate embodiments, only one or neither lever 44A, 44B is biased and therefore has no default position.

In the illustrated embodiment in which each lever 44A, 44B is biased to the lower, default position, each lever 44A, 44B is manually actuated upwardly from the lower position to incrementally rotate the toothed gear(s) or wheel(s) of a respective ratcheting web retractor in the web take-up direction and thereby incrementally tightening a respective one of the lap web(s) and thigh web(s) about the occupant 100. In the illustrated embodiment, each lever 44A, 44B returns under bias to its lower position, where the ratcheting process may be repeated. In embodiments in which the levers 44A, 44B are not biased to the lower position, each lever 44A, 44B must be manually returned to the lower position before repeating the ratcheting process.

Referring not to FIGS. 8 and 9, an example embodiment of the ratcheting web adjustment apparatus 140 is shown. In the illustrated embodiment, the lap webs 72A, 72B are provided in the form of a single length of web coupled to a dual-web retractor 142A mounted in the seat module base 34, and the thigh webs 74A, 74B are likewise provided in the form of a single length of web coupled to a dual-web retractor 142B mounted in the seat base. Examples of such dual-web retractors 142A, 142B are illustrated and described U.S. Patent Application Ser. No. 62/855,048, filed May 31, 2019, as assigned to the assignee of this disclosure, and the disclosure of which has been expressly incorporated herein by reference in its entirety. The retractors 142A, 142B include frames 144A, 144B to which a spool 146A, 146B is operatively mounted and coupled to a conventional power spring or main spring 148A, 148B configured to bias the spool 146A, 146B in the web take up direction. Each retractor 142A, 142B also includes a ratcheting apparatus 145A, 145B coupled thereto for selectively locking/releasing the retractor 142A, 142B and for incrementally shortening the respective web by ratcheting as described above. The release lever 42 is operatively coupled to the ratcheting apparatus 145A via a conventional cable C1, and the ratcheting lever 44B is operatively coupled to the ratcheting apparatus 145A via another conventional cable C2. The release lever 42 is operatively coupled to the ratcheting apparatus 145B via another conventional cable C3, and the ratcheting lever 44A is operatively coupled to the ratcheting apparatus 145B via another conventional cable C4.

Referring now to FIG. 9, some of the details of one of the web retractor 142A are shown. In the illustrated embodiment, the spool 146A is positioned and mounted between opposing side walls 144A1 and 144A2 of the frame 144A, and the cables C2 and C3 are operatively coupled to another frame wall 144A3 coupled to the side wall 144A2. The ratcheting apparatus 145A illustratively includes a spool extension 146A' couple to and rotating with the spool 146A, and a toothed wheel W rotatably mounted to the spool extension 146A'. A release pawl 150A defines a tooth 152A which normally engages the toothed wheel W when the release lever 42 is in its default position so as to lock the spool 146A from rotating in the web pay out direction. When the release lever 42 is actuated, the cable C1 draws the tooth 152A of the pawl 150A away from the wheel W so as to allow the spool 146A to rotate in the web take up and pay out directions. A conventional ratcheting member 156A is operatively coupled to the spool extension 146A' and includes a conventional rotational component 156A that is rotationally actuatable via the cable C2 to incrementally ratchet the spool 146A in the web take up direction as described above.

Figure 10:
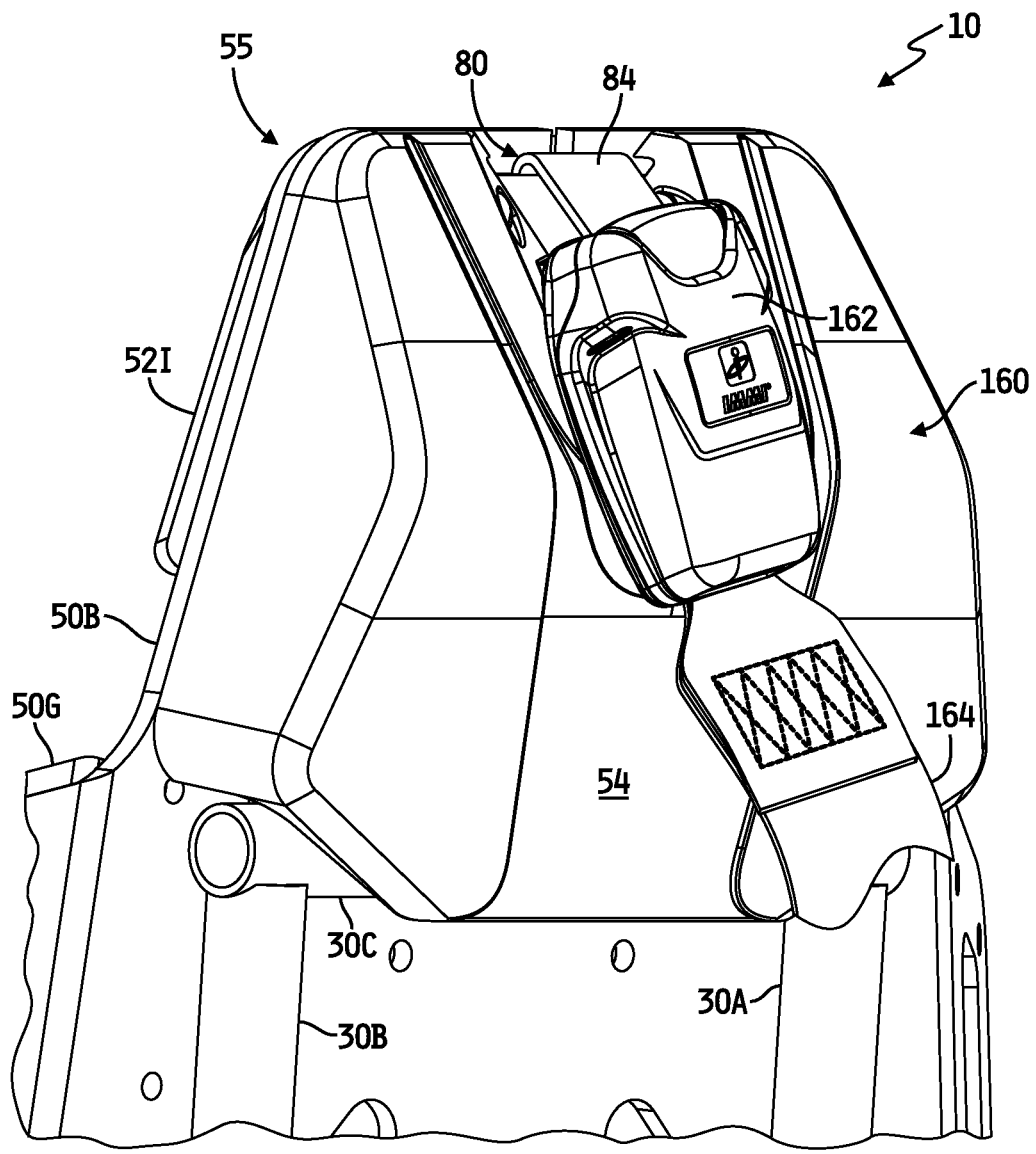
FIG. 10 is a magnified and rear perspective view similar to FIG. 3 and illustrating an embodiment of a portion of a seat restraint system releasably engaging the engagement assembly illustrated in FIG. 3 to restrain forward sliding and/or forward folding or pivoting of the vehicle seat relative to the motor vehicle.
Figure 11A:
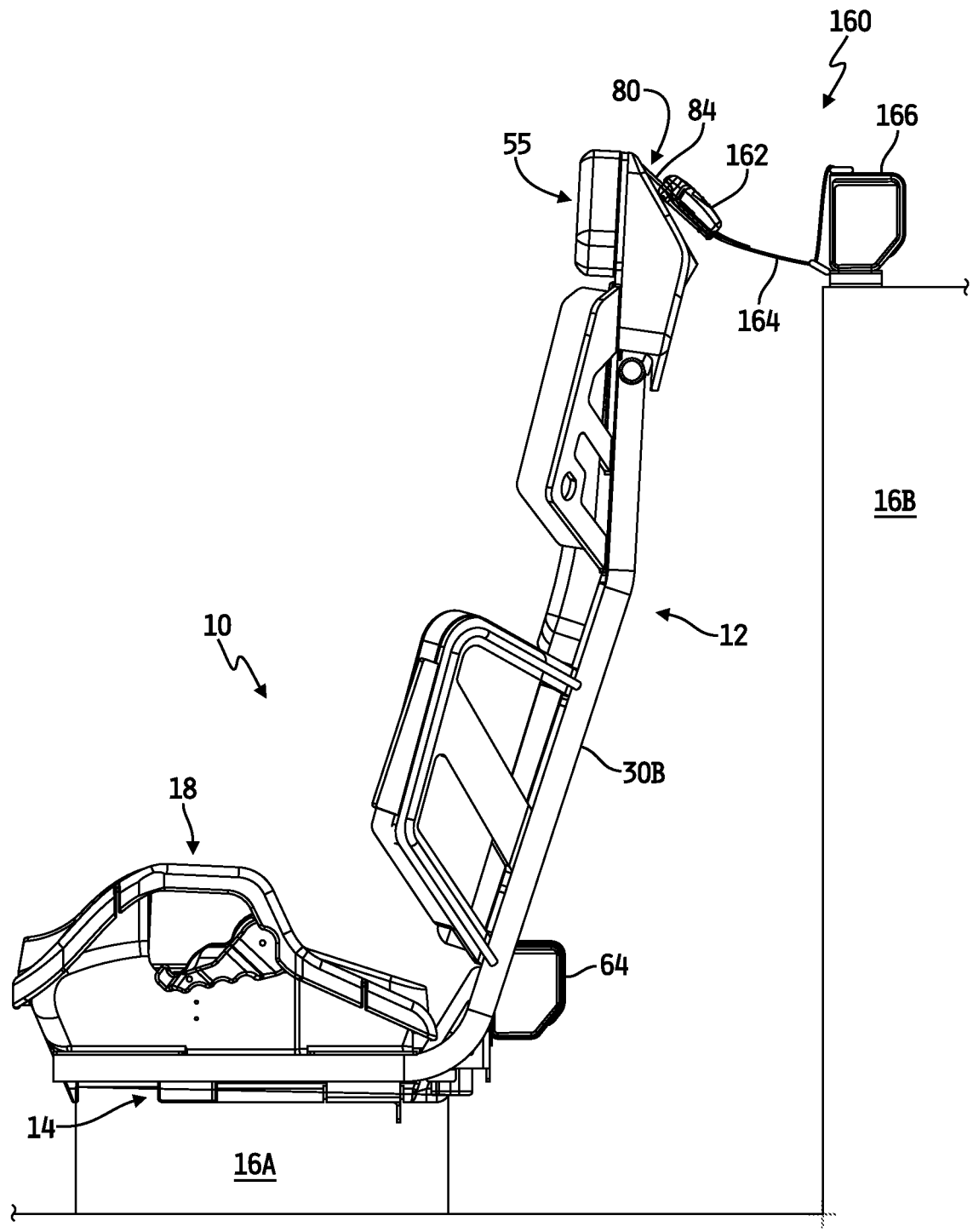
FIG. 11A is a side elevational view of the vehicle seat of FIGS. 1-10 and a portion of the motor vehicle in which the seat is mounted illustrating an embodiment of a seat restraint system, including an inertial locking structure, fixed to the motor vehicle and coupled to the engagement assembly of the vehicle seat for restraining forward sliding and/or forward folding or pivoting of the vehicle seat relative to the motor vehicle under operating conditions of motor vehicle which cause the inertial locking structure to lock.
Figure 11B:
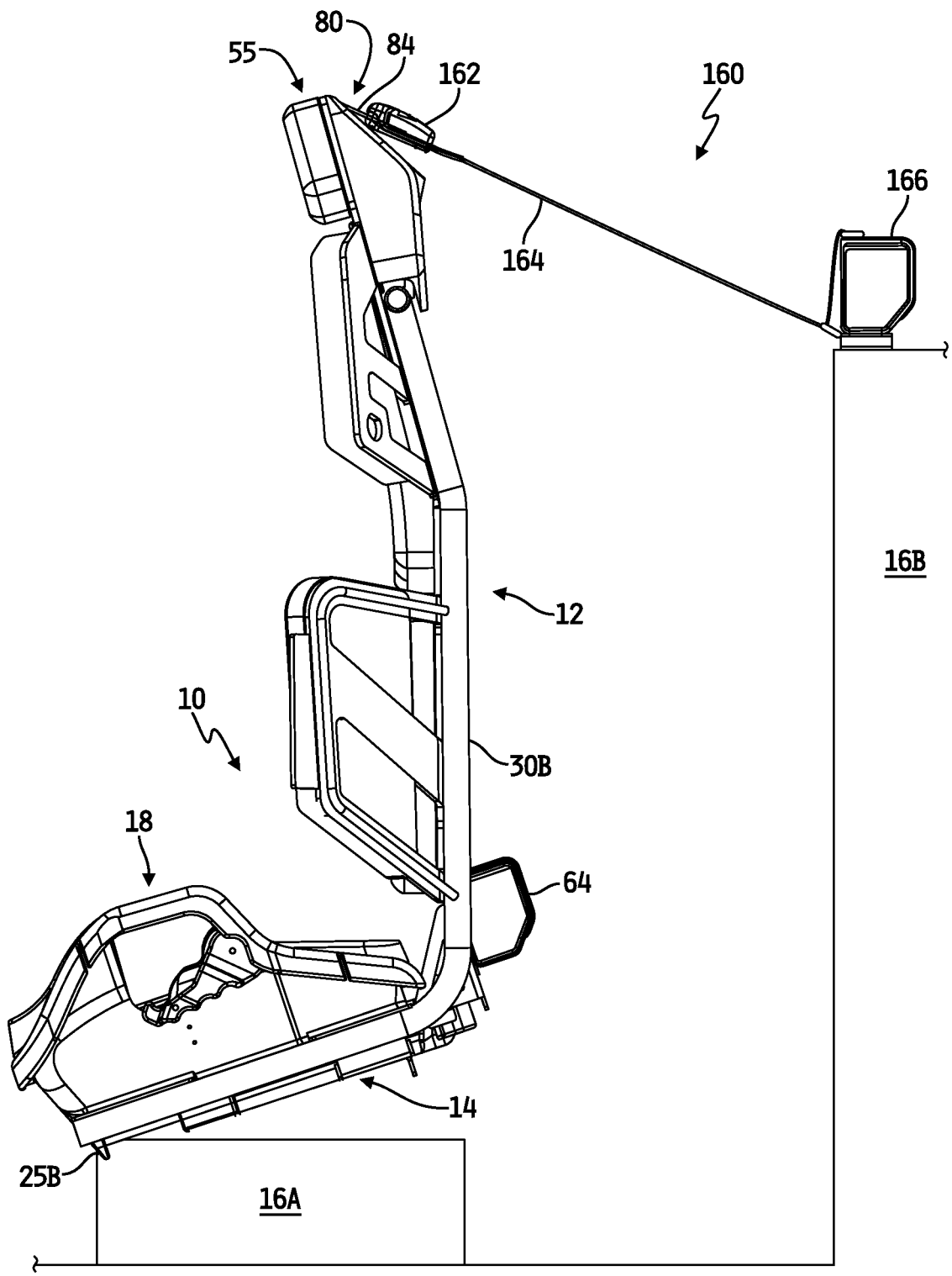
FIG. 11B is a side elevational view similar to FIG. 11A under operating conditions of the motor vehicle which do not cause the inertial locking structure to lock illustrating forward pivoting of the vehicle seat relative to the motor vehicle with the seat restraint system coupled to the engagement assembly of the vehicle seat.
Figure 11C:
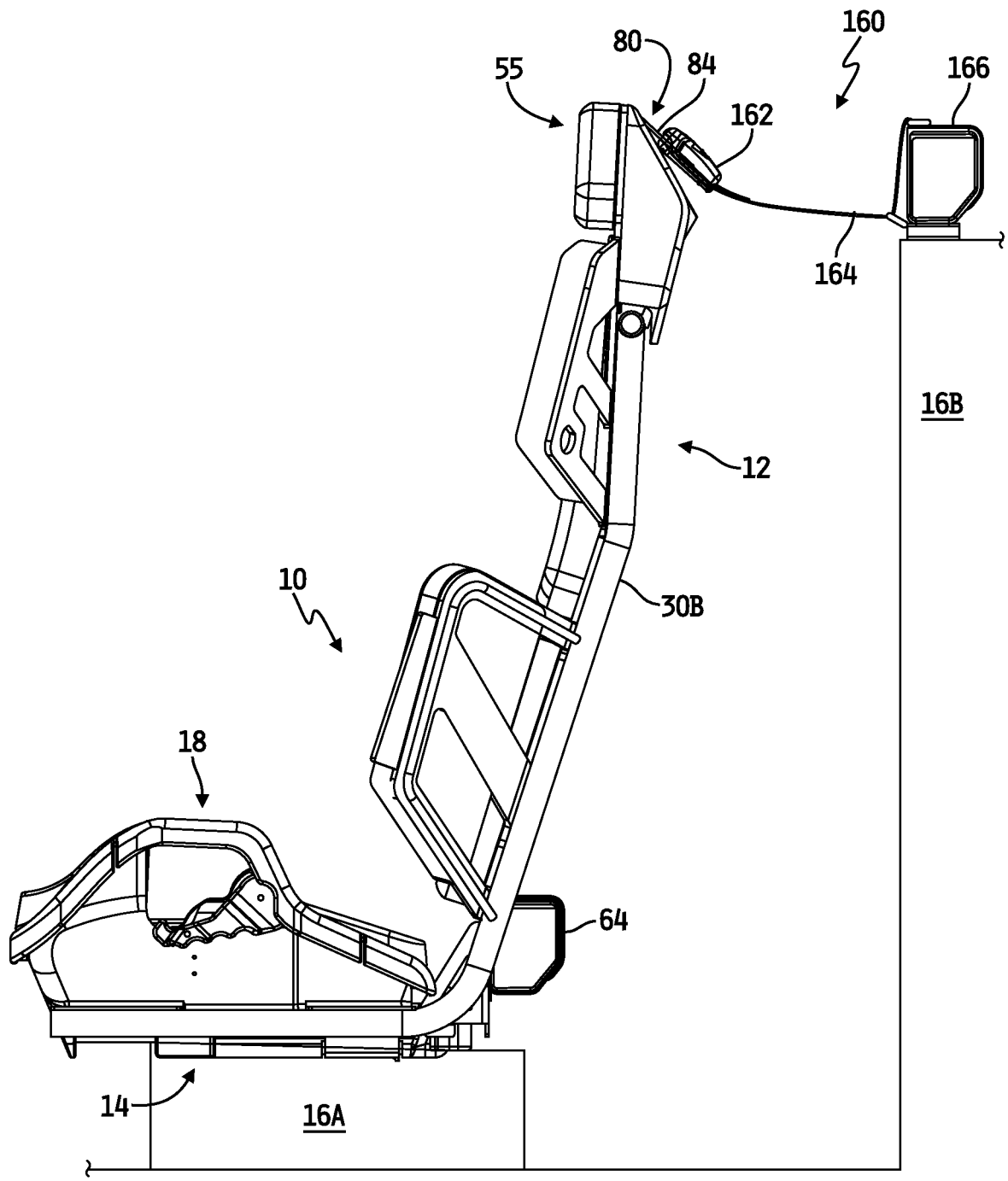
FIG. 11C is a side elevational view similar to FIGS. 11A and 11B under operating conditions of the motor vehicle which do not cause the inertial locking structure to lock illustrating forward sliding adjustment of the position of the vehicle seat relative to the motor vehicle with the seat restraint system coupled to the engagement assembly of the vehicle seat.

Referring now to FIGS. 10-11C, an embodiment of another restraint system 160 is shown for securing the vehicle seat 10 to a frame member 16B of the motor vehicle to prevent, at least under certain conditions, sliding or pivoting movement of the vehicle seat 10 but to allow such movement under static or normal operating conditions. Referring to FIG. 10, a portion of the restraint system 160 is shown which includes a conventional buckle member 162 releasably engaging the tongue member 84 mounted to the vehicle seat 10 as described above. Referring to FIG. 11A, the remainder of the restraint system 160 is shown which includes a conventional inertial locking retractor, e.g., a conventional ALR or ELR or other conventional inertial locking retractor 166, mounted, i.e., affixed, to the frame component 16B of the motor vehicle. One end of a web 164 is operatively attached to the retractor 166 and the other is attached to the buckle 162. Under dynamic operating conditions which results in locking of the inertial locking retractor 166, the vehicle seat 10 is prevented from pivoting forward or from sliding forward as described above. However, under static conditions or under other operating conditions in which the inertial locking retractor 166 is not locked, the vehicle seat 10 may be pivoted forwardly as illustrated by example in FIG. 11B or may be slidably adjusted to a more forward position as illustrated by example in FIG. 11C.

Figure 12:
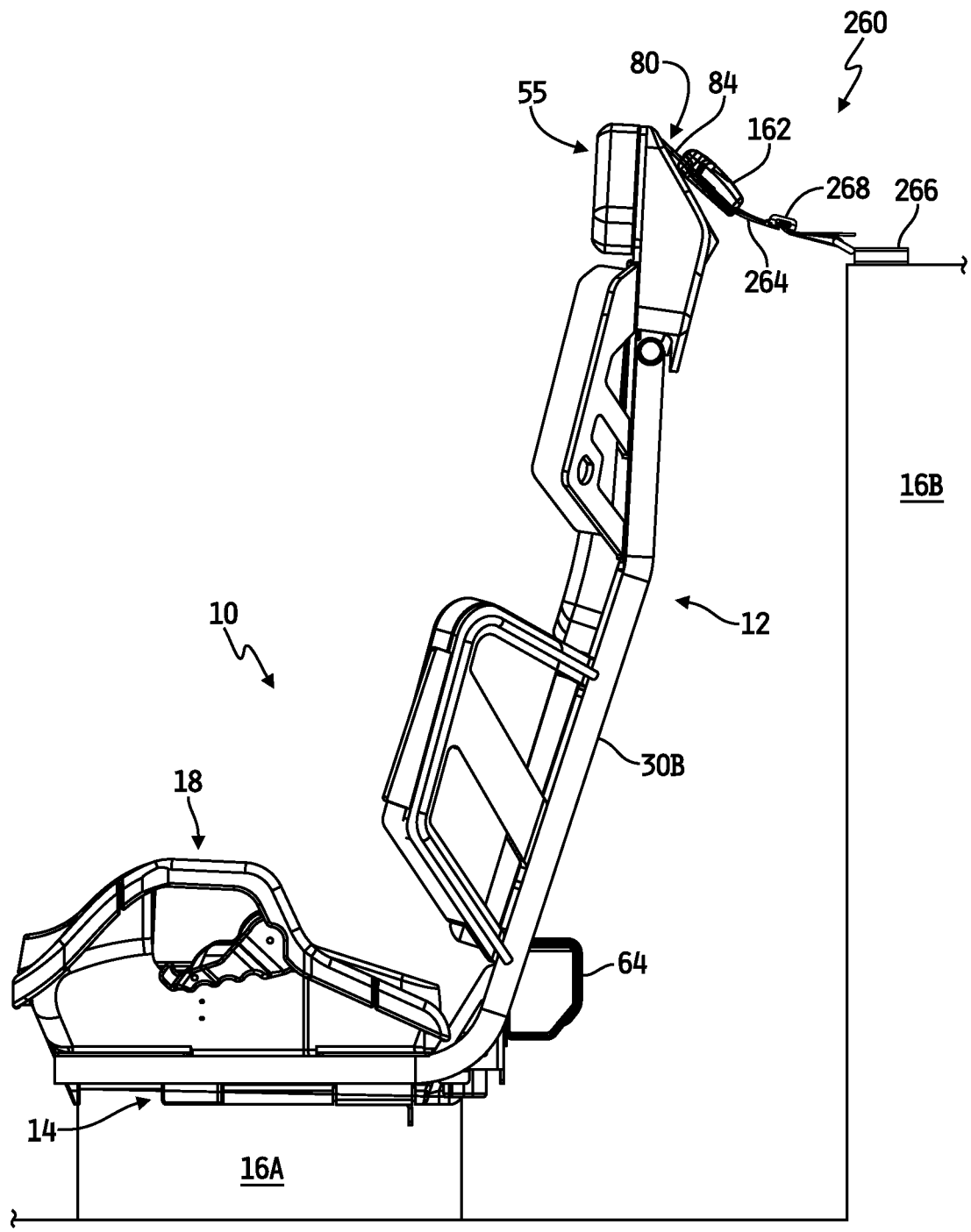
FIG. 12 is a side elevational view of the vehicle seat of FIGS. 1-10 and a portion of the motor vehicle in which the seat is mounted illustrating an embodiment of a manually adjustable seat restraint system fixed to the motor vehicle and coupled to the engagement assembly of the vehicle seat for restraining forward sliding and/or forward folding or pivoting of the vehicle seat relative to the motor vehicle when engaged with the engagement assembly.
Figure 13:
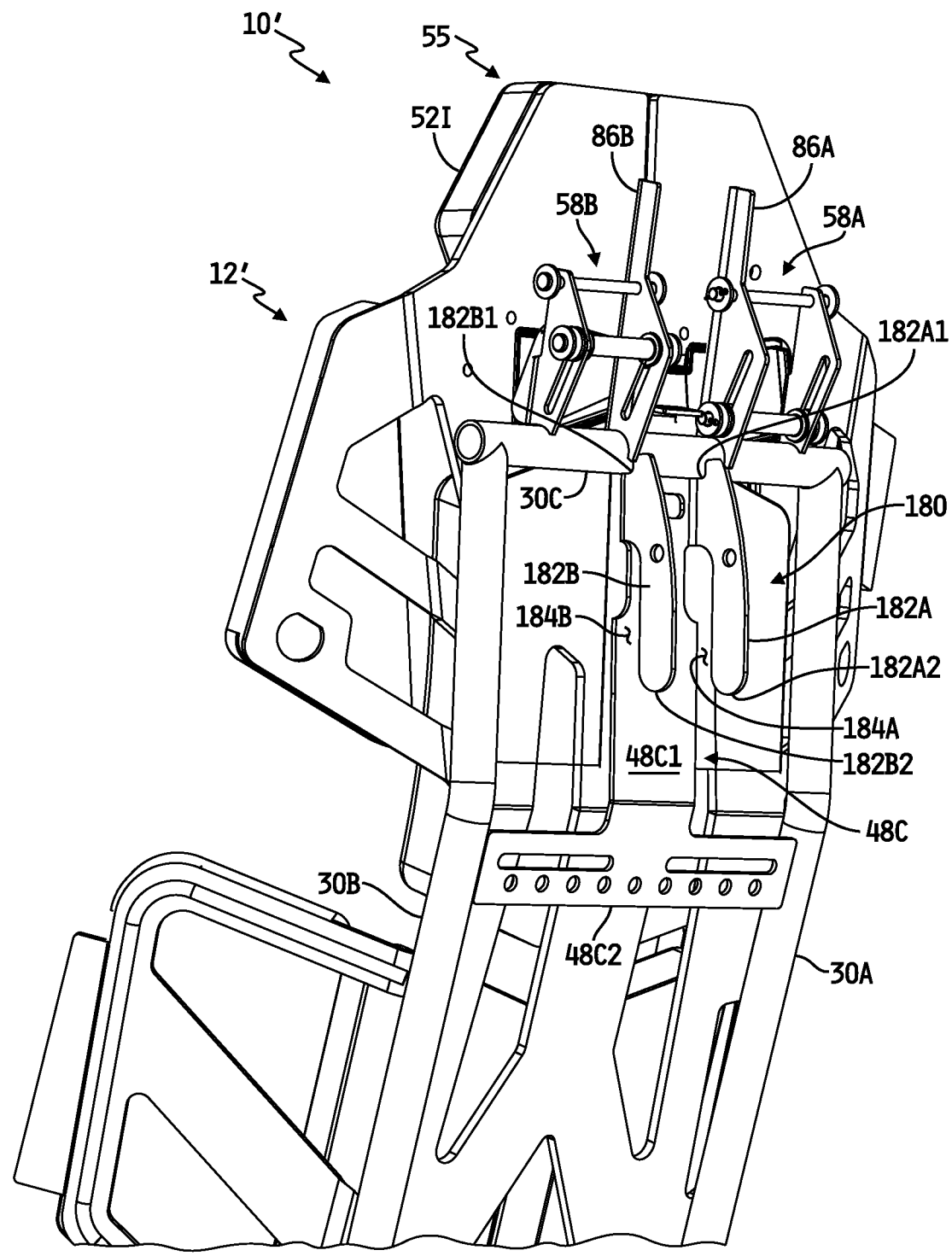
FIG. 13 is a magnified and rear perspective view of an upper portion of a seat back of another embodiment of a vehicle seat with various panels removed from the seat back to illustrate another embodiment of an engagement assembly mounted to the seat back and configured to engage another embodiment of a seat restraint system.

In FIG. 12, a variant 260 of the restraint system is shown in which one end of a web 264 is attached to the buckle 162 and the opposite end is secured to a stationary structure secured to the frame component 16B of the motor vehicle. In some embodiments, a manual web length adjuster 268 may be provided to allow for manual length adjustments of the web 264. In the embodiment illustrated in FIG. 12, the vehicle seat 10 is prevented from pivoting forward or from sliding forward under all conditions, and to pivot the seat 10 forward or slide the seat 10 forward the buckle member 162 must be disengaged from the tongue member 84.

Referring now to FIGS. 13-15D, an embodiment of another restraint system 360 for a variant 10' of vehicle seat 10 is shown which is configured and operable to selectively secure the seat back module 20 generally, and the interconnected frame components of the seat back module 20 in particular, to a frame 16B2 or other structural component of the motor vehicle. In embodiments in which the vehicle seat 10' is configured to pivot forwardly from its occupant support position as described above, and/or in which the vehicle seat 10' is configured to be adjustably positionable fore and aft as also described above, the restraint system 360 selectively secures the vehicle seat 10', in particular the frame of the vehicle seat 10', to the frame component 16B2 or other structural component of the motor vehicle, while also allowing for such pivoting and/or adjustable positioning of the vehicle seat 10'. By securing the interconnected frame components of the vehicle seat 10' to the frame 16B2 or other structural component of the motor vehicle, the restraint system 360 advantageously allows for the mounting of the shoulder web retractor 64 to the interconnected frame components of the vehicle seat 10' which, through the restraint system 360, secures the web retractor 64 to the frame 16B2 or other structure of the motor vehicle.

In the illustrated embodiment, the restraint system 360 includes a base bracket 362 mounted to the frame 16B2 or other structure of the motor vehicle, an elongated bracket 364 having spaced apart side walls 364A, 364B of a lower end $364_1$ pivotally mounted to the bracket 362 between spaced apart sidewalls 362A, 362B thereof via a pivot connector 366, e.g., a bolt, pin or the like, and an upper end $364_2$ extending away from the lower end, and a biasing member 368 coupled to and between the brackets 362, 364. In the illustrated embodiment, the elongated bracket 364 is a planar bracket, although in alternate embodiments one or more portions of the bracket 364 may be non-linear or piecewise linear. A tab or plate section 362C of the bracket 362 illustratively extends perpendicularly away from the plane formed by the bracket with a terminal end of the tab section 362C facing the rear of the vehicle seat 10'.

An elongated coupling pin 370 is transversely mounted to the terminal end of the bracket 364 adjacent to the upper end thereof such that a longitudinal axis extending centrally through the coupling pin 370 is perpendicular to a longitudinal axis extending centrally through the bracket 364. In the illustrated embodiment, the coupling pin 370 illustratively includes an elongated pin with guide wheels 370A, 370B mounted at each end thereof. The restraint system 360 further includes a conventional web retractor 372 mounted to the bracket 362 and/or to the frame 16B2 of the motor vehicle. A length of web 374 is operatively coupled at one end to a rotatable spool of the web retractor 372 and at the opposite end to the coupling pin 370, and the portion of the web 374 between the web retractor 372 and the coupling pin 370 rides on the upper surface of the tab section 362C of the bracket 362.

Figure 14:
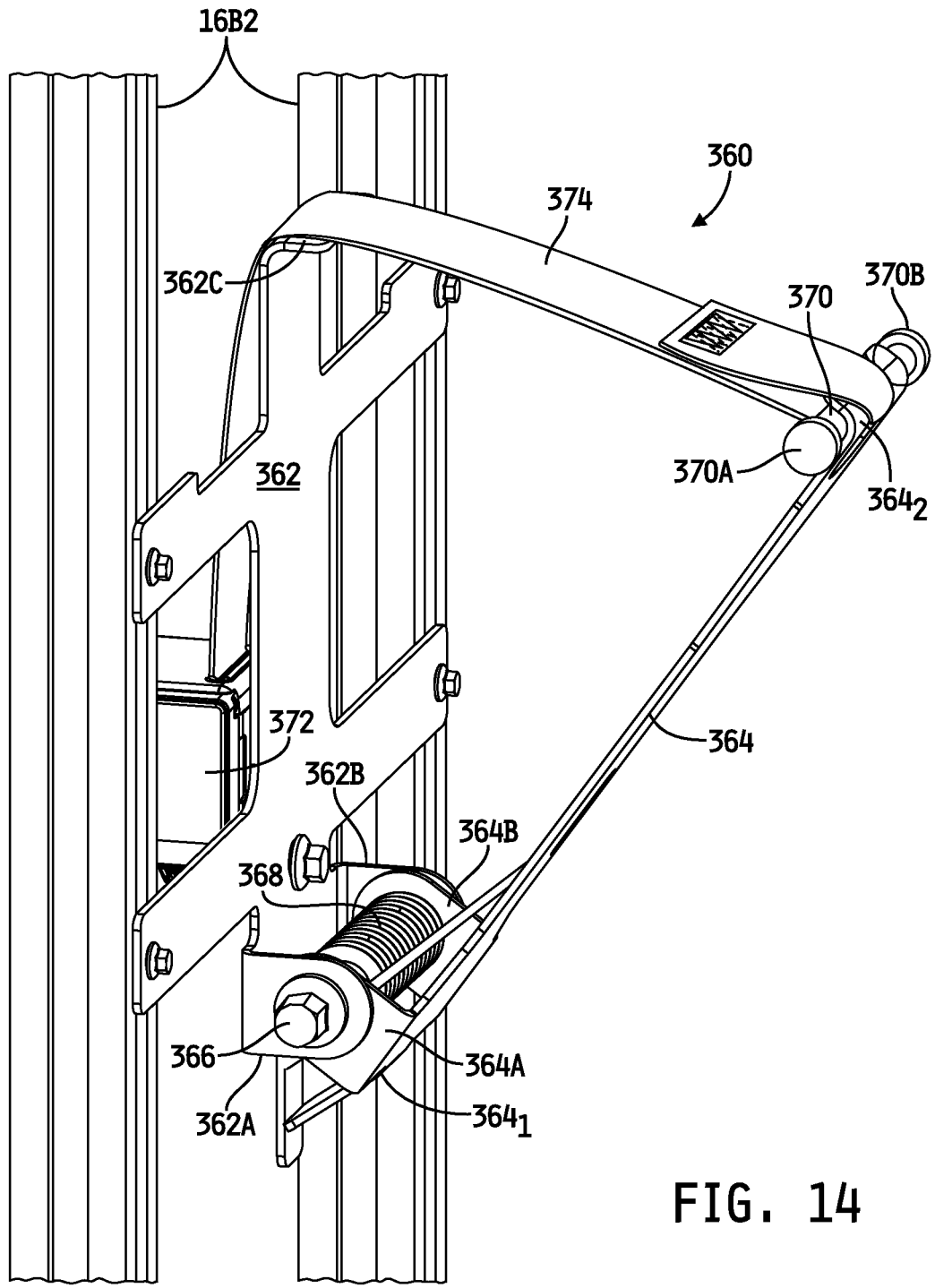
FIG. 14 is a perspective view of another embodiment of a seat restraint system, including an inertial locking structure, mounted to the motor vehicle and configured to automatically, releasably engage the engagement assembly of the vehicle seat illustrated in FIG. 13 to restrain forward sliding and/or forward folding or pivoting of the vehicle seat relative to the motor vehicle under operating conditions of motor vehicle which cause the inertial locking structure to lock.

The biasing member 368, e.g., a torsion spring, illustratively biases the bracket 364 away from the frame 16B2 such that the plane formed by and along the bracket 364 forms an angle about the pivot connector 366 with the plane formed by the bracket 362. Illustratively, the length of web 374 is selected to restrict pivoting of the bracket 364 about the pivot connector 366 to a maximum angle about the pivot connector 366, corresponding to a maximum linear distance of the coupling pin 370 from the plane formed by the bracket 362 as illustrated in FIG. 14. The bracket 364 is pivotable about the pivot connector 366 between a maximum angle a minimum angle in which the rearwardly facing surface of the bracket 364 is adjacent to or spaced apart by a predefined distance from the forwardly facing surface of the bracket 362.

The web retractor 372 illustratively includes a biasing member which biases the spool of the retractor 372 in the web take up direction. The biasing force of the biasing member 368 is illustratively greater than the biasing force of the biasing member of the web retractor 372 so that when the restraint system 360 is not being acted upon by the vehicle seat 10' the elongated bracket 364 pivots away from the bracket 362 and, in the process, draws the web 374 from the web retractor 372 until the maximum distance (or angle) allowed by the length of the web 374 is reached, at which point the restraint system 360 is in its fully extended position. If a force greater than, and generally opposite to, the biasing force of the biasing member 366 is applied to the bracket 364 and/or to the coupling pin 366, the bracket 364 pivots rearwardly about the pivot connector 366 as the biased spool of the web retractor 372 rotates in the web take-up direction and takes up the web 374 therein until the minimum distance (or angle) is reached, at which point the restraint system 360 is in its fully retracted position. In the illustrated embodiment, the web retractor 372 is an emergency locking retractor (ELR) configured in a conventional manner to lock the spool and prevent the spool from rotating in the web payout direction upon detection of a rapid rate of payout of the web therefrom and/or upon detection of vehicle deceleration exceeding a vehicle deceleration threshold.

In the illustrated embodiment, the vehicle seat 10' is provided with structural features 180 configured to selectively engage, or to be selectively engaged by, the restraint system 360 in a manner which secures the interconnected frame components of the seat back module 20 to the restraint system 360 and thus to the frame 16B2 of the motor vehicle. A rigid frame plate 48C1, 48C2 is illustratively affixed, i.e., secured, e.g., by welding or using a plurality of conventional fixation members, to each of the frame components 30A, 30B, 30C. With respect to the seat back panel 60A, 50B, the frame plate 48C1, 48C2 illustratively extends upwardly from the space defined between the upper wings 50E, 50G and the lower wings 50F, 50H to the transverse frame component 30C positioned near the tops of the upper wings 50E, 50G. In any case, a pair of elongated, laterally or transversely spaced apart engagement plates 182A, 182B are each secured at one end thereof to the frame plate 48C1 and, in some embodiments, to the transverse frame member 30C. The engagement plates 182A, 182B each extend downwardly away from the frame member 30C to terminal ends thereof, and a pair of matching spaces are defined between the rearwardly facing surface of the frame plate 48C1 and each respective one of the engagement plates 182A, 182B. The matching spaces are illustratively sized to receive therein respective portions of the coupling pin 370 therein. In the illustrated embodiment, the engagement plates 182A, 182B are illustratively at least partially arcuate in shape as then extend downwardly to the terminal ends thereof so as to guide the coupling pin 370 therein and therefrom as the vehicle seat 10' is pivoted forwardly and rearwardly about the hinges 25A, 25B as described above. Illustratively, all frame components 30A-30C, the engagement plates 182A, 182B, the coupling pin 370 and the brackets are made of a rigid, high-strength material such as steel.

The restraint system 360 just described is illustratively configured to automatically, i.e., without user intervention or manual actuation of the system 360, adjust to accommodate any fore or aft position of the vehicle seat 10' relative to the bracket 362 (i.e., relative to the frame 16B2 of the motor vehicle) while remaining coupled to the vehicle seat 10' at all times, and at any fore or aft position of the vehicle seat 10' to also disengage from the vehicle seat 10' when being pivoted forwardly from the occupant support position and reengage the vehicle seat 10' when being pivoted from any forwardly pivoted position back to the occupant support position.

Figure 15A:
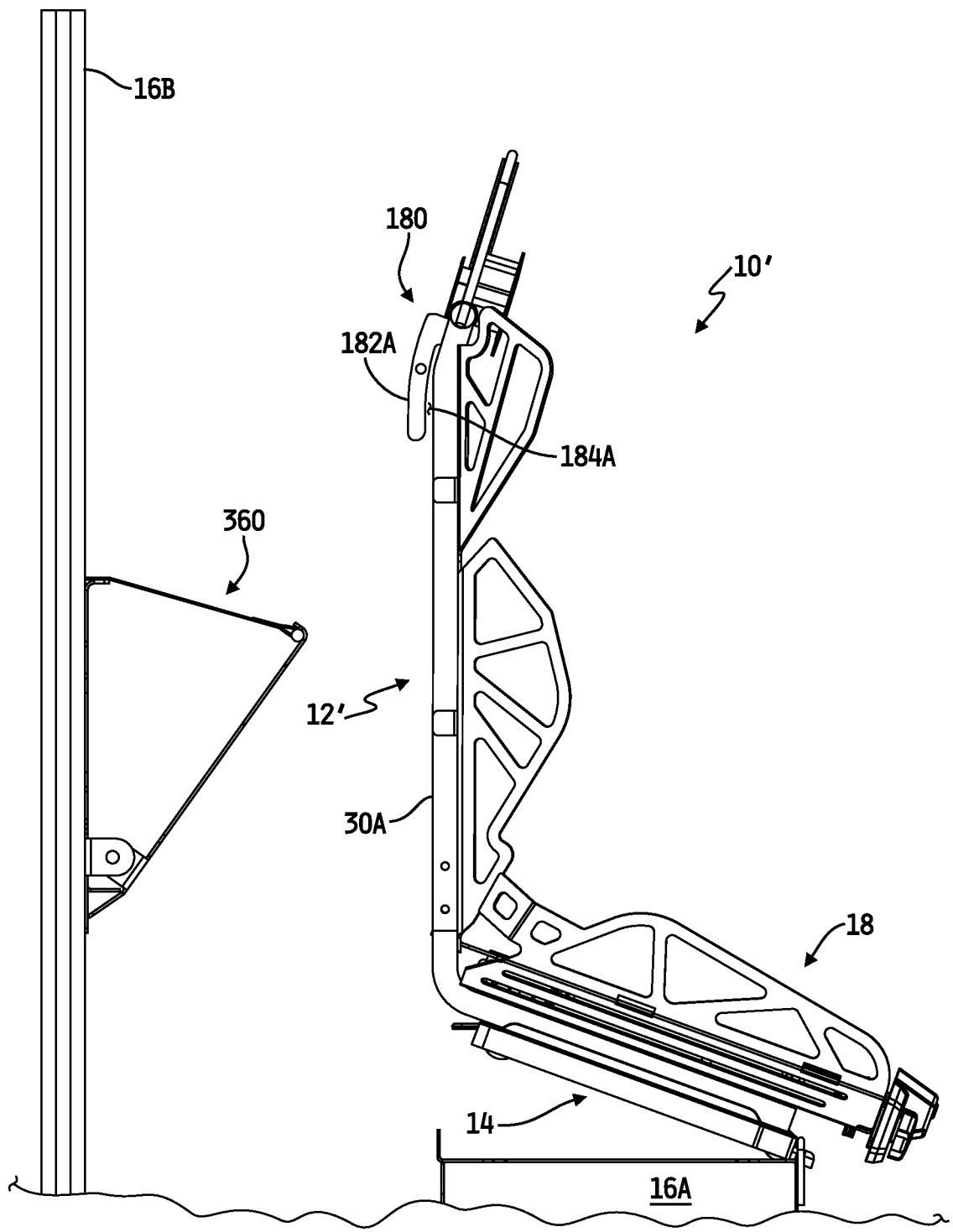
FIG. 15A is a side elevational view of the vehicle seat of FIG. 13 and a portion of the motor vehicle including the seat restraint system of FIG. 14 illustrating the vehicle seat pivoted to a forward position in which the seat restraint system is decoupled from the engagement assembly of the vehicle seat.
Figure 15B:
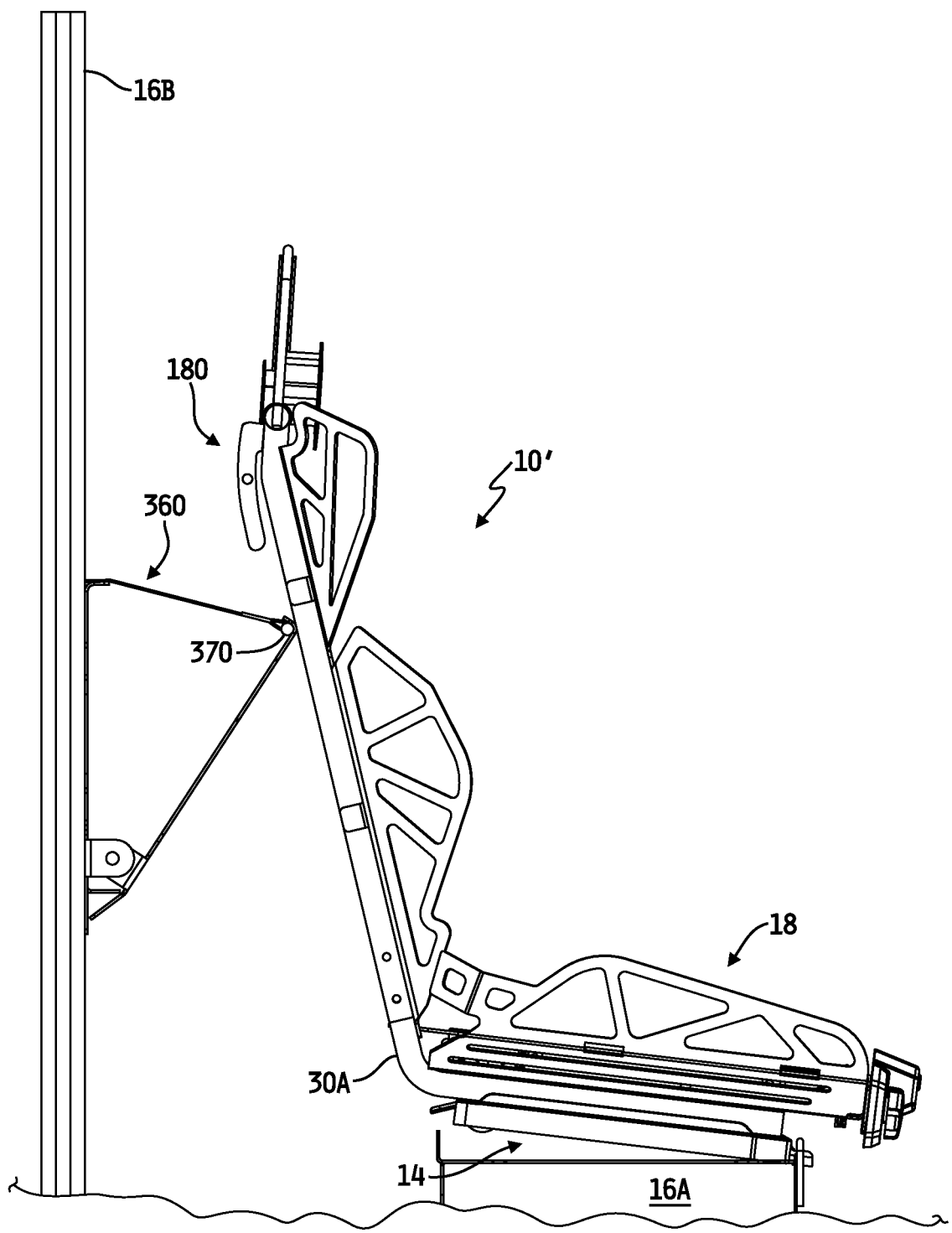
FIG. 15B is a side elevational view similar to FIG. 15A illustrating contact between the seat restraint system of FIG. 14 and the rear surface of the seat back as the vehicle seat is pivoted rearwardly from the forwardly pivoted position illustrated in FIG. 15A.
Figure 15C:
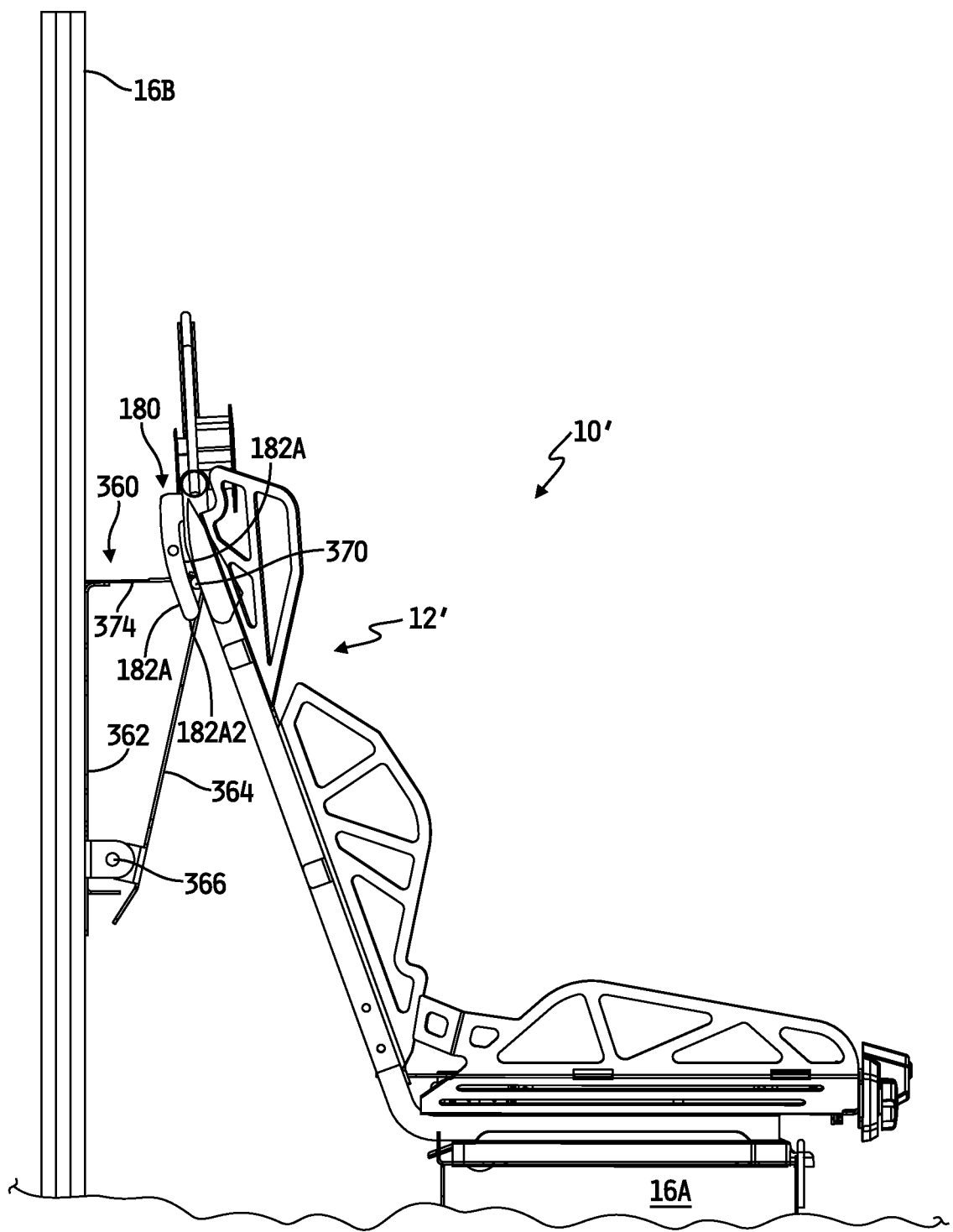
FIG. 15C is a side elevational view similar to FIGS. 15A and 15B engagement of the seat restraint system of FIG. 14 with the engagement assembly of the vehicle seat illustrated in FIG. 13 as the vehicle seat is fully pivoted rearwardly to an at-rest, occupant supporting position.

Starting with FIG. 15C, the vehicle seat 10' is shown in its occupant support position with the coupling pin 370 of the restraint system 360 received between the engagement plates 182A, 182B and the frame plate 48C1, 48C2 of the vehicle seat 10', thereby securing the vehicle seat 10' generally, and the frame components of the seat back module 20 in particular, to the frame 16B2 of the motor vehicle via the restraint system 360. Moving to FIG. 15A, the vehicle seat 10' has started pivoting forwardly from the occupant support position of FIG. 15C. The bracket 364 pivots toward the vehicle seat 10' about the pivot connector 366 in order to maintain contact between the coupling pin 370 and the frame plate 48C1, 48C2, e.g., between the coupling pin rollers 370A, 370B and the frame plate 48C1, to ensure that the engagement plates 182A, 182B clear the coupling pin 370 as the seat 10' pivots forwardly. In FIG. 15A, the vehicle seat 10' is shown pivoted to a forward position in which it is clear from the restraint system 360. In this position, the restraint system 360 is in its fully extended position.

Moving now to FIG. 15B, the vehicle seat 10' has been pivoted from a forward position clear of the restraint system 360 back toward the restraint system 360. In FIG. 15B, the coupling pin 370 has just made contact with the frame plate 48C1 below the terminal ends of the engagement plates 182A, 182B. The coupling pin guide wheels or rollers 370A, 370B ride along the frame plate 48C1 as pivoting of the vehicle seat 10' continues rearwardly, thereby guiding the elongated pin 370 into the spaces defined between the engagement plates 182A, 182B and the frame plate 48C1 as the rearward force of the frame plate 48C1 acting on the coupling pin 370 forces the bracket 364 to pivot toward the bracket 362 as the web 374 retracts within the web retractor 372.

Moving now to FIG. 15C, the vehicle seat 10' has completed pivoting rearwardly and is in its occupant support position. In this position, the coupling pin 370 has traveled upwardly through the spaces between the engagement plates 182A, 182B and the frame plate 48C1 to secure the restraint system 360 to the vehicle seat 10', and the bracket 362 has further pivoted toward the bracket 364 and the web 374 has further retracted within the web retractor 372.

Operation of the restraint system 360 to automatically, i.e., without user intervention or manual actuation of the system 360, adjust to accommodate any fore or aft position of the vehicle seat 10' relative to the bracket 362 (i.e., relative to the frame 16B2 of the motor vehicle) while remaining coupled to the vehicle seat 10' at all times is depicted in steps. Starting with FIG. 15C, the vehicle seat 10' is shown in its occupant support position with the coupling pin 370 of the restraint system 360 received between the engagement plates 182A, 182B and the frame plate 48C1 of the vehicle seat 10', thereby securing the vehicle seat 10' generally, and the frame components of the seat back module 20 in particular, to the frame 16B2 of the motor vehicle via the restraint system 360. As illustrated in FIG. 15C, the vehicle seat 10' is in its maximum forward position.

Figure 15D:
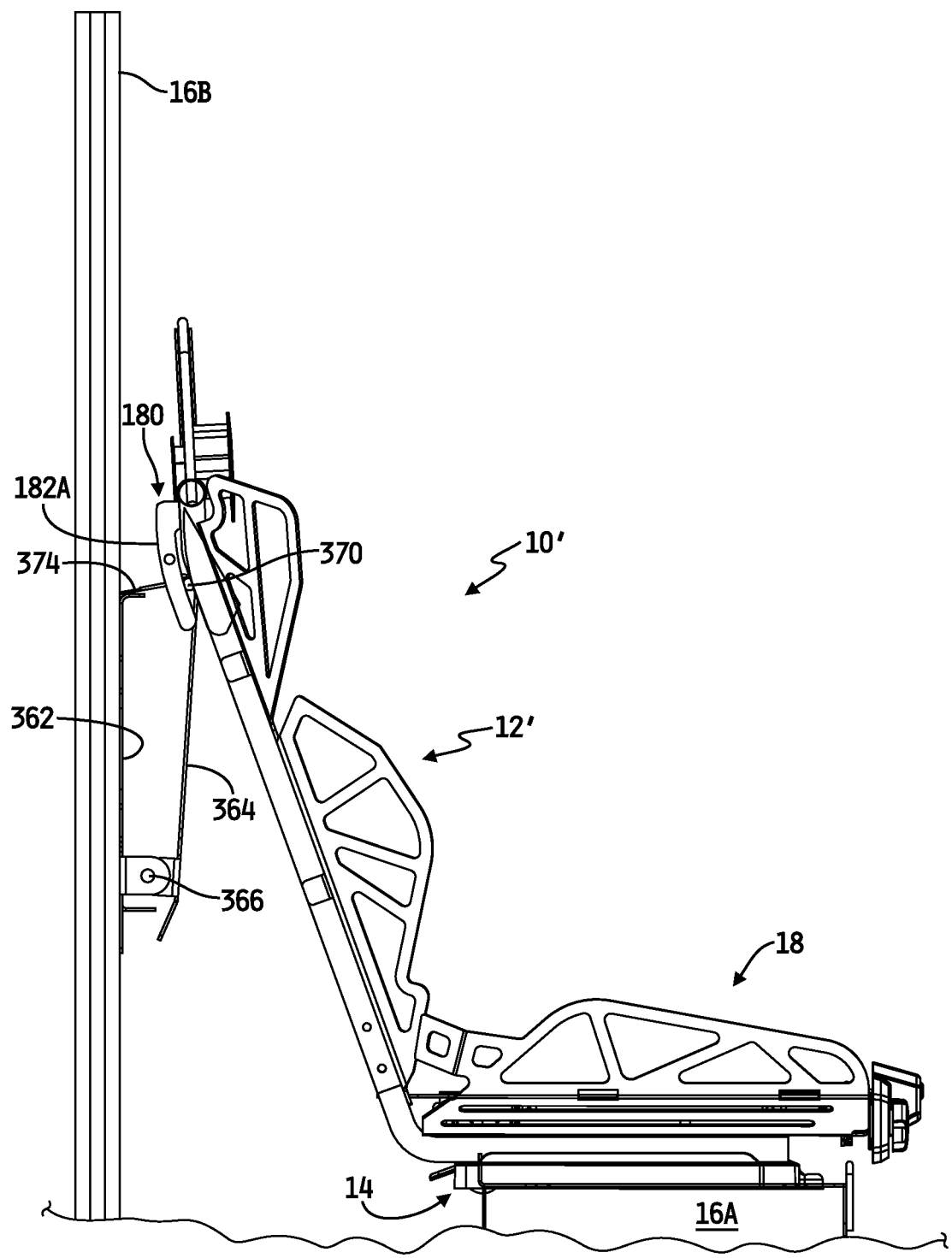
FIG. 15D is a side elevational view similar to FIGS. 15A-15C under operating conditions of the motor vehicle which do not cause the inertial locking structure to lock illustrating rearward sliding adjustment of the position of the vehicle seat relative to the motor vehicle with the seat restraint system coupled to the engagement assembly of the vehicle seat.

In FIG. 15D, the occupant has actuated the seat adjustment lever and has then applied a rearward force to the vehicle seat 10' to adjust the position of the vehicle seat 10' relative to the floor or floor frame members 16A, 16B. In FIG. 15D, the vehicle seat 10' has been moved to is maximum rearward position. It is evident that rearward movement of the vehicle seat 10' while in the occupant supporting position has forced the bracket 364 to pivot rearwardly so as to maintain the coupling pin 370 engaged between the engagement plates 182A, 182B as described above. As the vehicle seat 10' has moved rearwardly, the web 374 has retracted within the web retractor 372 as also described above. Illustratively, the restraint system 360 is configured such that in the maximum rearward position of the vehicle seat 10', the restraint system is at or near is fully retracted or compact configuration.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A restraint system for a vehicle seat operatively mounted in a motor vehicle, comprising:
a restraint web operatively coupled to at least one of the vehicle seat and the motor vehicle,
an elongated sleeve received on and at least partially about the restraint web, and
a sleeve position adjuster coupled to the sleeve and including an actuator normally engaging a portion of the restraint web to fix a position of the sleeve relative to the restraint web and responsive to actuation thereof to disengage from the restraint web to allow the sleeve to be moved along the restraint web, the sleeve position adjuster including a biasing member configured to normally bias the actuator to engage the portion of the restraint web to fix the position of the sleeve relative to the restraint web.

2. The restraint system of claim 1, wherein the restraint web is a shoulder web which forms part of a restraint harness operatively coupled to the vehicle seat and configured to restrain an occupant seated in the vehicle seat.

3. The restraint system of claim 1, wherein the restraint web is a lap web which forms part of a restraint harness operatively coupled to the vehicle seat and configured to restrain an occupant seated in the vehicle seat.

4. The restraint system of claim 1, further comprising a restraint harness operatively coupled to the vehicle seat and configured to restrain an occupant seated in the vehicle seat, the restraint harness including a first shoulder web extending over or through a seat back of the vehicle seat,
wherein the first shoulder web is the restraint web,
and wherein the elongated sleeve is a first elongated sleeve received on and at least partially about the first shoulder web,
and wherein the actuator is a first actuator normally engaging a portion of the first shoulder web.

5. The restraint system of claim 4, wherein the restraint harness includes a second shoulder web extending over or through the seat back, and further comprising:
a second elongated sleeve received on and at least partially about the second shoulder web, and
a second sleeve position adjuster coupled to the second sleeve and including a second actuator normally engaging a portion of the second shoulder web to fix a position of the second sleeve relative to the second shoulder web and responsive to actuation thereof to disengage from the second shoulder web to allow the second sleeve to be moved along the second shoulder web.

6. The restraint system of claim 1, wherein the elongated sleeve comprises an elongated pad.

7. The restraint system of claim 1, wherein the sleeve position adjuster comprises a housing mounted to the sleeve, wherein the housing and the sleeve each define aligned openings therethrough,
and wherein the actuator is movably coupled to the housing and includes a clamping portion and a lever portion extending away from the clamping portion, the actuator having an unactuated position in which the clamping portion extends through the aligned openings and engages the portion of the restraint web to fix the position of the sleeve relative to the restraint web, and an actuated position in which the clamping portion disengages from the restraint web to allow the sleeve to be moved along the restraint web.

8. The restraint web of claim 7, wherein the biasing member is coupled between the lever portion and the housing, the biasing member normally biasing the clamping portion to the unactuated position.

9. A restraint system for a motor vehicle, comprising:
an occupant seat mounted to at least one of a plurality of frame components of the motor vehicle, the occupant seat having a seat bottom and a seat back extending upwardly away from the seat bottom,
a restraint harness operatively coupled to the vehicle seat and configured to restrain an occupant seated in the vehicle seat, the restraint harness including a first shoulder web extending over or through the seat back,
a first elongated sleeve received on and at least partially about the first shoulder web, and
a first sleeve position adjuster coupled to the first sleeve and including a first actuator normally engaging a portion of the first shoulder web to fix a position of the first sleeve relative to the first shoulder web and responsive to actuation thereof to disengage from the first shoulder web to allow the first sleeve to be moved along the first shoulder web, the first sleeve position adjuster including a biasing member configured to normally bias the first actuator to engage the portion of the first shoulder web to fix the position of the first sleeve relative to the first shoulder web.

10. The restraint system of claim 9, wherein the first sleeve position adjuster comprises a housing mounted to the first sleeve, wherein the housing and the first sleeve each define aligned openings therethrough,
and wherein the first actuator is movably coupled to the housing and includes a clamping portion and a lever portion extending away from the clamping portion, the first actuator having an unactuated position in which the clamping portion extends through the aligned openings and engages the portion of the first shoulder web to fix the position of the first sleeve relative to the first shoulder web, and an actuated position in which the clamping portion disengages from the first shoulder web to allow the first sleeve to be moved along the first shoulder web.

11. The restraint web of claim 10, wherein biasing member is coupled between the lever portion and the housing, the biasing member normally biasing the clamping portion to the unactuated position.

12. The restraint system of claim 9, wherein the restraint harness includes a second shoulder web extending over or through the seat back, and further comprising:
a second elongated sleeve received on and at least partially about the second shoulder web, and
a second sleeve position adjuster coupled to the second sleeve and including a second actuator normally engaging a portion of the second shoulder web to fix a position of the second sleeve relative to the second shoulder web and responsive to actuation thereof to disengage from the second shoulder web to allow the second sleeve to be moved along the second shoulder web.

13. The restraint system of claim 12, wherein the first and second elongated sleeves comprise first and second respective elongated pads.

14. The restraint system of claim 12, further comprising:
a first web attenuator mounted to the seat back, wherein a portion of the first shoulder web extending over or through the seat back is supported on and by the first web attenuator, and
a second web attenuator mounted to the seat back, wherein a portion of the second shoulder web extending over or through the seat back is supported on and by the second web attenuator,
wherein the first and second web attenuators are configured to dampen forces applied thereto by respective ones of the first and second shoulder webs under dynamic operating conditions of the motor vehicle.

15. The restraint system of claim 9, wherein the occupant seat is pivotably mounted to the at least one of the plurality of frame components of the motor vehicle such that the occupant seat is pivotable between an at rest position to support the occupant and a forward tilted position to permit access to a portion of the motor vehicle rearwardly of the occupant seat,
and wherein the restraint system further comprises means for selectively preventing pivoting of the occupant seat forwardly from the at rest position of the occupant seat.

16. A restraint system for a motor vehicle, comprising:
an occupant seat mounted to at least one of a plurality of frame components of the motor vehicle, the occupant seat having a seat bottom and a seat back extending upwardly away from the seat bottom,
a restraint harness operatively coupled to the vehicle seat and configured to restrain an occupant seated in the vehicle seat, the restraint harness including a first shoulder web extending over or through the seat back,
a first web attenuator mounted to the seat back, wherein a first portion of the first web extending over or through the seat back is supported on and by the first web attenuator, the first web attenuator configured to dampen forces applied thereto by the first shoulder web under dynamic operating conditions of the motor vehicle,
a first elongated sleeve received on and at least partially about a second portion of the first shoulder web which extends downwardly from the first portion along a front of the seat back, and
a first sleeve position adjuster coupled to the first sleeve and including a first actuator normally engaging a portion of the first shoulder web to fix a position of the first sleeve relative to the first shoulder web and responsive to actuation thereof to disengage from the first shoulder web to allow the first sleeve to be moved along the first shoulder web.

17. The restraint system of claim 16, wherein the restraint harness includes a first shoulder web extending over or through the seat back, and further comprising:
a second web attenuator mounted to the seat back, wherein a first portion of the second web extending over or through the seat back is supported on and by the second web attenuator, the second web attenuator configured to dampen forces applied thereto by the second shoulder web under dynamic operating conditions of the motor vehicle,
a second elongated sleeve received on and at least partially about a second portion of the second shoulder web which extends downwardly from the first portion of the second web along a front of the seat back, and
a second sleeve position adjuster coupled to the second sleeve and including a second actuator normally engaging a portion of the second shoulder web to fix a position of the second sleeve relative to the second shoulder web and responsive to actuation thereof to disengage from the second shoulder web to allow the second sleeve to be moved along the second shoulder web.

18. The restraint system of claim 17, wherein the first and second elongated sleeves comprise first and second respective elongated pads.

19. The restraint system of claim 16, wherein the occupant seat is pivotably mounted to the at least one of the plurality of frame components of the motor vehicle such that the occupant seat is pivotable between an at rest position to support the occupant and a forward tilted position to permit access to a portion of the motor vehicle rearwardly of the occupant seat,
and wherein the restraint system further comprises means for selectively preventing pivoting of the occupant seat forwardly from the at rest position of the occupant seat.

20. The restraint system of claim 16, wherein the first sleeve position adjuster comprises a housing mounted to the first sleeve, wherein the housing and the first sleeve each define aligned openings therethrough,
and wherein the first actuator is movably coupled to the housing and includes a clamping portion, a lever portion extending away from the clamping portion and a biasing member coupled between the lever portion and the housing, the first actuator having an unactuated position in which the clamping portion extends through the aligned openings and engages the portion of the first shoulder web to fix the position of the first sleeve relative to the first shoulder web, and an actuated position in which the clamping portion disengages from the first shoulder web to allow the first sleeve to be moved along the first shoulder web, the biasing member biasing the clamping portion to the unactuated position.

* * * * *